US012518956B2

(12) United States Patent
Stewart et al.

(10) Patent No.: US 12,518,956 B2
(45) Date of Patent: Jan. 6, 2026

(54) TIME OF FLIGHT MASS ANALYSER AND METHOD OF TIME OF FLIGHT MASS SPECTROMETRY

(71) Applicant: Thermo Fisher Scientific (Bremen) GmbH, Bremen (DE)

(72) Inventors: Hamish Stewart, Bremen (DE); Dmitry Grinfeld, Bremen (DE); Philipp Cochems, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 343 days.

(21) Appl. No.: 18/364,400

(22) Filed: Aug. 2, 2023

(65) Prior Publication Data

US 2024/0055250 A1 Feb. 15, 2024

(30) Foreign Application Priority Data

Aug. 10, 2022 (GB) ...................................... 2211694

(51) Int. Cl.
*H01J 49/40* (2006.01)

(52) U.S. Cl.
CPC .................................... *H01J 49/40* (2013.01)

(58) Field of Classification Search
USPC ........................................................ 250/287
See application file for complete search history.

(56) References Cited

U.S. PATENT DOCUMENTS

| | | | |
|---|---|---|---|
| 6,998,607 | B1 | 2/2006 | Davis et al. |
| 7,518,107 | B2 | 4/2009 | Gabeler et al. |
| 8,704,193 | B1 | 4/2014 | Kholomeev et al. |
| 9,136,101 | B2 | 9/2015 | Grinfeld et al. |
| 10,593,525 | B2 | 3/2020 | Hock et al. |
| 2006/0043283 | A1 | 3/2006 | Davis et al. |
| 2022/0392759 | A1* | 12/2022 | Stewart .................. H01J 49/40 |

FOREIGN PATENT DOCUMENTS

| | | | |
|---|---|---|---|
| GB | 2328076 | A | 2/1999 |
| GB | 2329066 | A | 3/1999 |
| GB | 2607580 | A | 12/2022 |
| GB | 2608365 | A | 1/2023 |
| JP | 2017059385 | A | 3/2017 |

OTHER PUBLICATIONS

Combined Search and Examination Report under Sections 17 & 18(3) for related GB Application No. 2211694.1, dated Jan. 31, 2023, 7 pages.

Combined Search and Examination Report under Sections 17 & 18(3) for related GB Application No. 2211694.1, dated Mar. 8, 2023, 7 pages.

* cited by examiner

*Primary Examiner* — Kiet T Nguyen

(57) ABSTRACT

A Time of Flight (TOF) mass analyser comprises an ion source, a detector, an electrode, and a resistive divider comprising first and second resistors. The ion source and the detector define an ion flight path from the ion source to the detector. The electrode is arranged along the ion flight path and receives an output voltage. Thermal expansion produces a first mass shift/Kelvin of detected ions. The resistive divider is thermally coupled to the TOF mass analyser to receive an input voltage and output an output voltage to the electrode. The first and second resistors have respective first and second temperature coefficients that provide a voltage shift/Kelvin to the output voltage to the electrode producing a second mass shift/Kelvin of detected ions, compensating for the first mass shift/Kelvin.

21 Claims, 7 Drawing Sheets

TIME OF FLIGHT MASS ANALYSER AND METHOD OF TIME OF FLIGHT MASS SPECTROMETRY

CROSS REFERENCE TO RELATED APPLICATIONS

This application claims priority from application GB2211694.1, filed Aug. 10, 2022. The entire disclosure of application GB2211694.1 is incorporated herein by reference.

FIELD OF THE DISCLOSURE

The present disclosure relates to Time of Flight (TOF) mass spectrometry and a time of flight mass analyser.

BACKGROUND

Time of Flight (TOF) and Multiple Reflection Time of Flight (MRTOF) mass analysers typically aim to measure mass to within a few parts-per-million (ppm) of the true value, with sub-ppm accuracy being desirable. U.S. Pat. No. 9,136,101 B2 is one example of a MRTOF mass analyser known in the art.

It is known that thermal expansion or contraction of ion optical elements, spacers and mounting parts in a TOF mass analyser causes a change in the flight path length, and thus a shift in the measured time-of-flight, and corresponding mass assignment. Various techniques are known in the art for compensating for the effects of temperature change for a TOF mass analyser.

U.S. Pat. No. 7,518,107 B2 discloses methods and apparatus for compensating for mass error for a TOF mass analyser. A reference flight distance for a pulse of ions corresponding to a reference temperature of one or more components of an ion flight path assembly is determined, and the temperature of one or more components of the ion flight path assembly is measured. Correlating the thermal expansion of the flight path assembly with the temperature measurement allows the measured flight times to be adjusted to correspond with the reference flight distance to thereby compensate for the thermal expansion of the flight path assembly. A mass spectrum is obtained using the adjusted flight times. In various embodiments, the temperature signal is used with pre-determined thermal expansion correction factors for the flight path assembly to calculate a correction factor to control another component of the TOF mass analyser, such as the voltage applied to a power supply system or a signal to control clock frequencies.

U.S. Pat. No. 10,593,525 B2 discloses a method of calibrating a TOF mass spectrometry mass spectrum, to account for temperature changes. Ions are introduced into a Fourier Transform Mass Spectrometer (FTMS) and their mass to charge ratios are determined. Ions, including calibrant ions, are also introduced into a TOF mass analyser and the mass to charge ratios of the calibrant ions at least are also determined. Specific peaks representative of calibrant ions are selected and matched between the TOF mass analyser and the FTMS spectra. The relative position of matched peaks in each spectrum is then used to determine a temperature correction factor for the TOF mass analyser data, based upon the relative independence of the FTMS spectrum with respect to temperature.

U.S. Pat. No. 6,998,607 B1 discloses a temperature compensated TOF mass analyser. The TOF mass analyser comprises materials which have different thermal expansion coefficients, combined in such a way that the length of the drift region of the TOF mass analyser is variant, and self-adjusting with temperature. The adjustment is such as to compensate for the length changes resulting from thermal expansion or contraction in other ion optical elements, such that ions of substantially equivalent mass to charge ratios maintain a constant flight time though the system. This allows for use of standard construction methods for the ion optical elements.

Against this background, the present disclosure aims to provide an improved, or at least commercially relevant alternative, TOF mass analyser and a method of Time of Flight mass spectrometry.

SUMMARY

According to a first aspect of the disclosure, a Time of Flight (TOF) mass analyser is provided. The TOF mass analyser comprises an ion source, a detector, an electrode, and a resistive divider. The ion source and the detector are arranged to define an ion flight path from the ion source to the detector. The electrode is arranged along the ion flight path and configured to receive an output voltage. Thermal expansion of the TOF mass analyser results in a first mass shift per Kelvin of ions detected at the detector. The resistive divider comprises a first and second resistor, wherein the resistive divider is thermally coupled to the time of flight mass analyser; and configured to receive an input voltage and output the output voltage to the electrode. The first and second resistors have respective first and second temperature coefficients configured to provide a voltage shift per Kelvin to the output voltage to the electrode which results in a second mass shift per Kelvin of ions detected at the detector which compensates for the first mass shift per Kelvin.

In the TOF mass analyser of the first aspect, ions travel from the ion source to the detector along an ion flight path. Ideally, the ion flight path has a fixed ion flight path length such that the time of flight of the ions along the ion flight path can be used to determine the mass of the ions. A change in temperature of the TOF mass analyser may result in mechanical changes (e.g. due to thermal expansion) of the TOF mass analyser which results in a change in the length of the ion flight path. Accordingly, it will be appreciated that thermal expansion of the TOF mass analyser results in a first mass shift per Kelvin of ions detected at the detector.

To counteract the effects of thermal expansion, the TOF mass analyser of the first aspect includes a resistive divider which is configured to provide an output voltage to an electrode of the TOF mass analyser. The output voltage has an associated voltage shift per Kelvin, based on the temperature coefficients of the resistors forming the resistive divider. As the resistive divider is thermally coupled to the TOF mass analyser, a change in the temperature of the mass analyser results in a corresponding perturbation to the output voltage based on the voltage shift per Kelvin of the resistive divider. The voltage perturbation provided by the resistive divider affects the electric field produced by the electrode such that ions travelling on the ion flight path are also perturbed. The perturbation to the ions travelling also results in a shift in the time of flight of the ions along the ion flight path. As such, the voltage shift per Kelvin of the resistive divider results in an associated second mass shift per Kelvin of ions detected at the detector. By selecting appropriate temperature coefficients for the resistive divider, the second mass shift per Kelvin can be provided to compensate for the first mass shift per Kelvin of the TOF mass analyser.

It will be appreciated that the resistive divider provides a passive method of temperature compensation for the TOF mass analyser. As such, the temperature compensation provided by the resistive divider does not require any active control of the resistive dividers or real-time sensing of the temperature of the TOF mass analyser. Rather, the resistive divider is thermally coupled to the TOF mass analyser such that any changes in temperature of the TOF mass analyser are also experienced by the resistive divider.

According to this disclosure, "compensation" of the mass error resulting from thermal expansion (e.g. compensation of the first mass shift per Kelvin) is understood to mean that the magnitude of the mass error is eliminated, or at least reduced in magnitude. That is to say, the magnitude of the combined first and second mass shifts per Kelvin is less than the magnitude of the first mass shift per Kelvin.

According to this disclosure, reference to a mass of an ion detected by a detector of a mass analyser may is understood to be a reference to measurement of a mass to charge ratio of an ion by a detector. As such, the terms "mass" and "mass to charge ratio (m/z)" are used interchangeably in this disclosure. Similarly, reference to a "mass shift per Kelvin", or a "mass shift per volt" may be used interchangeably with the terms "mass to charge ratio shift per Kelvin" or "mass to charge per volt" respectively. Further, according to this disclosure, the first mass shift per Kelvin of ions detected at the detector reflects the change in the detected mass (i.e. the change in the measured mass to charge ratio) of an ion of known mass (i.e. known mass to charge ratio) that occurs when the mass analyser changes temperature by 1 Kelvin in the absence of any temperature compensation strategy according to this disclosure. The first mass shift per Kelvin may, in some embodiments, account for the mass shift that results from thermal expansion of the TOF mass analyser. In some embodiments, the first mass shift per Kelvin of the TOF mass analyser may account for additional features of the TOF mass analyser which cause a change in the detected mass based on temperature, for example perturbations to the input voltage from a power supply.

It will be appreciated that the electrode to which the resistive divider is connected may be any suitable electrode of the mass analyser. For example, in some embodiments where the TOF mass analyser comprises an ion mirror, the electrode (to which the resistive divider is connected) may be provided as part of the ion mirror. As such, the ion mirror comprising the electrode is arranged along the flight path and configured to receive the output voltage. Accordingly, it will be appreciated that the temperature compensating resistive divider may be applied to a range of different TOF mass analyser designs.

In some embodiments, the TOF mass analyser comprises a vacuum chamber, wherein the electrode and the restive divider are provided within the vacuum chamber. By providing the resistive divider within the same vacuum chamber as the electrode, the resistive divider may be thermally coupled to TOF mass analyser such that any changes in the temperature of the vacuum chamber (and the components within) may also be transferred to the resistive divider. In some embodiments, the resistive divider may be thermally coupled to the electrode of the TOF mass analyser such that the temperature of the resistive divider more accurately tracks the temperature of the electrode, thereby improving the accuracy of the thermal compensation. For example, the resistive divider may be mounted on the electrode using a suitable fixing (e.g. bolts, solder, or a dedicated fitting).

In some embodiments, the first and second temperature coefficients are different. That is to say, rather than simply selecting first and second resistors with the lowest temperature coefficients to minimise resistance drift, one or more resistors may intentionally be selected with a higher temperature coefficient such that the overall mass shift of the mass analyser per degree Kelvin is reduced.

In some embodiments, the first mass shift per Kelvin of the TOF mass analyser is at least +1 ppm/K. It will be appreciated that the first mass shift per Kelvin of the ToF mass analyser may vary significantly depending on whether the TOF mass analyser is provided with any other temperature compensating features. For example, a TOF mass analyser of a generally aluminium and/or steel construction may have a first mass shift per Kelvin of at least 20 ppm/K. Mass analysers having some form of temperature compensation may have a mass shift per Kelvin of about 1 to 10 ppm/K.

In some embodiments, a magnitude of the combination of the first and second mass shifts per Kelvin is no greater than 5 ppm/K, 3 ppm/K, or 1 ppm/K. That is to say, the second mass shift per Kelvin of the resistive divider may be selected to reduce the overall mass shift per Kelvin of the TOF mass analyser (i.e. the combination of the first and second mass shifts per Kelvin) to a magnitude of no greater than: 5 ppm/K, 3 ppm/K, or 1 ppm/K. By reducing the magnitude of the overall mass shift per Kelvin of the mass analyser, the TOF mass analyser may be operated more accurately.

In some embodiments, one or more of the first and second resistors may be provided as a plurality of resistive components. For example, the first resistor or the second resistor may be provided by a plurality of resistive components, each resistive component having an associated temperature coefficient. Each resistive component forming either the first or second resistor may be combined in series and/or parallel in order to provide an overall resistance corresponding to the first/second resistance and an overall temperature coefficients corresponding to the first/second temperature coefficient.

In some embodiments, the TOF mass analyser is connected to a voltage supply configured to provide the input voltage to the resistive divider. It is not required that the voltage supply is thermally coupled to the TOF mass analyser. In some embodiments where the input voltage of the voltage supply is also prone to thermal drift, causing an associated mass shift per Kelvin, such a mass shift per Kelvin may be accounted for as part of the first mass shift per Kelvin of the TOF mass analyser.

In some embodiments, the voltage supply comprises a temperature control circuit configured to control the input voltage. As such, in some embodiments, the temperature control circuit may provide a relatively stable input voltage to the resistive divider. The temperature control circuit of the voltage supply may be passively controlled, or actively controlled. As the voltage supply may not be not thermally coupled to the TOF mass analyser, any change in temperature experienced by the voltage supply may not be experienced, or may not be experienced in the same way, as by the resistive divider. Accordingly, the TOF mass analyser of the first aspect may include the temperature compensation of the resistive divider to further reduce variations in mass error introduced by temperature variance.

According to a second aspect of the disclosure, a time of flight (TOF) mass analyser is provided. The TOF mass analyser comprises: an ion source and a detector. The ion source and the detector are arranged to define an ion flight path from the ion source to the detector, the ion flight path comprising a first region and a second region. Thermal expansion of the time of flight mass analyser results in a first mass shift per Kelvin of ions detected at the detector. The time of flight mass analyser further comprises a compensation electrode thermally coupled to the time of flight mass analyser and arranged along the ion flight path in the second region of the ion flight path. The compensation electrode is configured to cause ions to travel along the ion flight path in the second region at a higher speed than the speed of the ions in the first region. The compensation electrode has a thermal expansion coefficient such that thermal expansion of the compensation electrode causes a second mass shift per Kelvin of ions detected at the detector which compensates for the first mass shift per Kelvin.

According to the second aspect of the disclosure, the first mass shift per Kelvin of the TOF mass analyser may be compensated for by the provision of a compensation electrode. For example, at least part of the first mass shift per Kelvin may result from thermal expansion of the TOF mass analyser. Thermal expansion of the TOF mass analyser results in an increase in a length of the ion flight path (based on a thermal expansion coefficient for the TOF mass analyser). The thermal expansion coefficient of the compensation electrode may be different to that of the TOF mass analyser such that the relative length of the high speed region to the low speed region changes with temperature.

For example, where the thermal expansion coefficient of the compensation electrode is selected to be higher than the thermal expansion coefficient of the ToF mass analyser, the ratio of the length of the high speed region to the length of the low speed region increases as the TOF mass analyser expands. By causing ions to spend a greater proportion of the total flight time travelling through the high speed region, the thermal expansion of the compensation electrode can compensate for some, or all, of the thermal expansion of the TOF mass analyser.

As discussed above for the first aspect, the first mass shift per Kelvin of the mass analyser may reflect the change in the detected mass of an ion of known mass that occurs when the mass anlayser changes temperature by 1 Kelvin in the absence of any temperature compensating strategy according to this disclosure. As such, the first mass shift per Kelvin may account for the thermal expansion of the ion flight path. In some embodiments, the first mass shift per Kelvin may also account for mass shifts which result from thermal expansion of other ion optics devices, or for thermal drift associated with power supplies or control electronics for the TOF mass analyser. That is to say, the first mass shift per Kelvin to be compensated by the compensation electrode may be different to the mass shift per Kelvin which results from only the thermal expansion of the ion flight path.

According to the second aspect, the compensation electrode is thermally coupled to the TOF mass analyser. As such, the compensation electrode is configured to passively respond to changes in the temperature of the TOF mass analyser. That is to say, the compensation electrode provides passive compensation for thermal expansion/thermal drift of the TOF mass analyser.

In some embodiments, the TOF mass analyser of the second aspect comprises an ion mirror. In some embodiments, the compensation electrode is arranged along the ion flight path between the ion mirror and the detector. In some embodiments, the compensation electrode may be arranged along the ion flight path between the ion mirror and the detector. As such, it will be appreciated that the compensation electrode may be provided in various different configurations along the ion flight path.

In some embodiments, the compensation electrode may be arranged along the ion flight path in a plurality of regions. That is to say, there may be a plurality of second regions of the ion flight path in which the ions travel at a relatively higher speed and at least one region of the ion flight path where the ions travel at a relatively lower speed.

In some embodiments, the compensation electrode is configured to receive a voltage from a voltage supply, the voltage supply connected to the TOF mass analyser. It is understood that it the voltage supply is not required to be thermally coupled to the TOF mass analyser. The voltage received by the compensation electrode provides the accelerating potential to accelerate the ions in the high speed region.

In some embodiments, the compensation electrode is arranged on the ion flight path closer to the detector than the ion mirror. In some embodiments, the compensation electrode may be configured to receive a voltage from a voltage supply such that the compensation electrode is at the same potential as a potential of the detector. In particular, in some embodiments, the compensation electrode may be mounted to the detector. By arranging the compensation electrode closer to the detector, a second region of the ion flight path in which ions travel at a relatively higher speed may be provided closer to the detector than a first region in which ions travel at a relatively slower speed. Accordingly, ions arriving at the detector may be travelling at a higher speed due to the presence of the compensation electrode, thereby improving the collection efficiency of the detector.

In some embodiments, the TOF mass analyser may comprise a plurality of ion mirrors. For example, the TOF mass analyser may comprise a pair of ion mirrors arranged opposite each other such that ions on the ion flight path are reflected between the pair of ion mirrors a plurality of times. In some embodiments, the compensation electrode may be arranged between the pair of ion mirrors. As such, the TOF mass analyser may be a multiple reflection TOF (MRTOF) mass analyser.

In some embodiments, a length of the ion flight path has a thermal expansion coefficient which is different to the thermal expansion coefficient of the compensation electrode. That is to say, the change in the relative length of the ion flight path (for example due to thermal expansion of the TOF mass analyser) with temperature (which can be represented by a thermal expansion coefficient) is different to the thermal expansion coefficient of the compensation electrode. Accordingly, the ratio of the length of the second region of the ion flight path to the length of the ion flight path varies changes with temperature. In some embodiments, the thermal expansion coefficient of the compensation electrode is greater than the thermal expansion coefficient of the length of the ion flight path. Such a relationship may allow the increase in the length of the second region (relative to the overall length of the ion flight path) to compensate for a mass shift resulting from thermal expansion of the TOF mass analyser.

In some embodiments, the first mass shift per Kelvin of the TOF mass analyser is at least +2 ppm/K or at least +5 ppm/K. It will be appreciated that the first mass shift per Kelvin of the TOF mass analyser may vary significantly depending on whether the TOF mass analyser is provided with any other temperature compensating features, and the materials from which the TOF mass analyser is constructed. For example, a TOF mass analyser of a generally aluminium and/or steel construction may have a first mass shift per Kelvin of at least +20 ppm/K.

As per the first aspect, in some embodiments a magnitude of the combination of the first and second mass shifts per Kelvin may be no greater than 5 ppm/K, 3 ppm/K, or 1 ppm/K.

In some embodiments, the compensation electrode may be a telescopic compensation electrode. The telescopic compensation electrode may comprise a first telescopic portion, a second telescopic portion and a spring, the spring being arranged between the first and second telescopic portions. The spring may be configured to cause the relative positions of the first and second telescopic portions to change in response to a change in temperature of the telescopic compensation electrode. By providing a telescopic compensation electrode, the length of the second region of the ion flight path may be varied by telescopically extending (or retracting) the second telescopic portion relative to the first telescopic portion using the spring. Such a telescopic arrangement may provide for greater changes in the length of the second region with temperature, thereby allowing the compensation electrode to compensate for relatively high magnitude first mass shifts per Kelvin of the TOF mass analyser.

In some embodiments, where the compensation electrode is configured to receive a voltage from a voltage supply, the voltage supply may be configured to calibrate the voltage provided to the compensation electrode in order to calibrate the second mass shift per Kelvin. For example, the voltage supply may be configured to tune or calibrate the second mass shift per Kelvin based on a mass to charge ratio of an ion to be analysed. Accordingly, the passive compensation of the compensation electrode also provides for relatively small adjustments to be made in order in the operating condition of the mass analyser in order to further improve the accuracy of the TOF mass analyser.

In some embodiments, the TOF mass analyser may comprise a resistive divider comprising a first and second resistor, the resistive divider thermally coupled to the time of flight mass analyser; and configured to receive an input voltage and output the output voltage to an electrode. In some embodiments, the output voltage may be the compensation electrode. The first and second resistors may have respective first and second temperature coefficients configured to provide a voltage shift per Kelvin to the output voltage to the electrode which results in a third mass shift per Kelvin of ions detected at the detector wherein the second and third mass shifts per Kelvin compensates for the first mass shift per Kelvin. As such, in some embodiments the compensation electrode of the TOF mass analyser of the second aspect may be used as the electrode in the TOF mass analyser of the first aspect to which the output of the resistive divider is connected. Alternatively, the resistive divider of the first aspect may be connected to another electrode of the TOF mass analyser, different to the compensation electrode. It will be appreciated that the optional features described above in relation to the first and second aspects may be combined in embodiments where the resistive divider and the compensation electrode are provided together.

According to a third aspect of the disclosure, a method of Time of Flight mass spectrometry is provided. The method comprises:

- measuring a time of flight for ions to travel along an ion flight path from an ion source to a detector using a TOF mass analyser, wherein an electrode is arranged along the ion flight path and receives an output voltage,
- wherein thermal expansion of the TOF mass analyser results in a first mass shift per Kelvin of ions detected at the detector,
- wherein the TOF mass analyser is provided with a resistive divider comprising a first and second resistor, the resistive divider thermally coupled to the TOF mass analyser, and configured to receive an input voltage and output the output voltage to the electrode,
- wherein the first and second resistors have respective first and second temperature coefficients which result in a voltage shift per Kelvin to the output voltage to the electrode which results in a second mass shift per Kelvin of ions detected at the detector which compensates for the first mass shift per Kelvin.

As such, the method of the third aspect may be performed by a ToF mass analyser according to the first aspect. The method according to the third aspect may incorporate equivalent method features to any of the optional features of the first aspect.

According to a fourth aspect of the disclosure, a method of Time of Flight mass spectrometry is provided. The method comprises:

- measuring a time of flight for ions to travel along an ion flight path from an ion source to a detector using a time of flight (TOF) mass analyser, the ion flight path comprising a first region and a second region;
- wherein thermal expansion of the TOF mass analyser results in a first mass shift per Kelvin of ions detected at the detector, and
- wherein a compensation electrode thermally coupled to the TOF mass analyser and arranged along the ion flight path in the second region of the ion flight path, wherein the compensation electrode is configured to cause ions to travel along the ion flight path in the second region at a higher speed than the speed of the ions in the first region,
- wherein the compensation electrode has a thermal expansion coefficient such that thermal expansion of the compensation electrode causes a second mass shift per Kelvin of ions detected at the detector which compensates for the first mass shift per Kelvin.

As such, the method of the fourth aspect may be performed by a TOF mass analyser according to the second aspect. The method according to the fourth aspect may incorporate equivalent method features to any of the optional features of the second aspect. The method of the fourth aspect may also be combined with the method of the third aspect to incorporate a resistive divider.

It will be appreciated that the methods of TOF mass spectrometry described in the third and fourth aspects may be applied to any suitable type of analysis. For example, the methods may be methods of data dependent analysis (DDA) mass spectrometry, or the methods be methods of data independent analysis (DIA) mass spectrometry. In some embodiments, the methods may comprises performing a plurality of analyses, over which the compensation electrode and/or the resistive divider provides passive compensation for any changes in temperature.

BRIEF DESCRIPTION OF THE FIGURES

Embodiments of the present disclosure will now be described, by way of example only, with reference to the accompanying figures in which.

DETAILED DESCRIPTION

Figure 1:
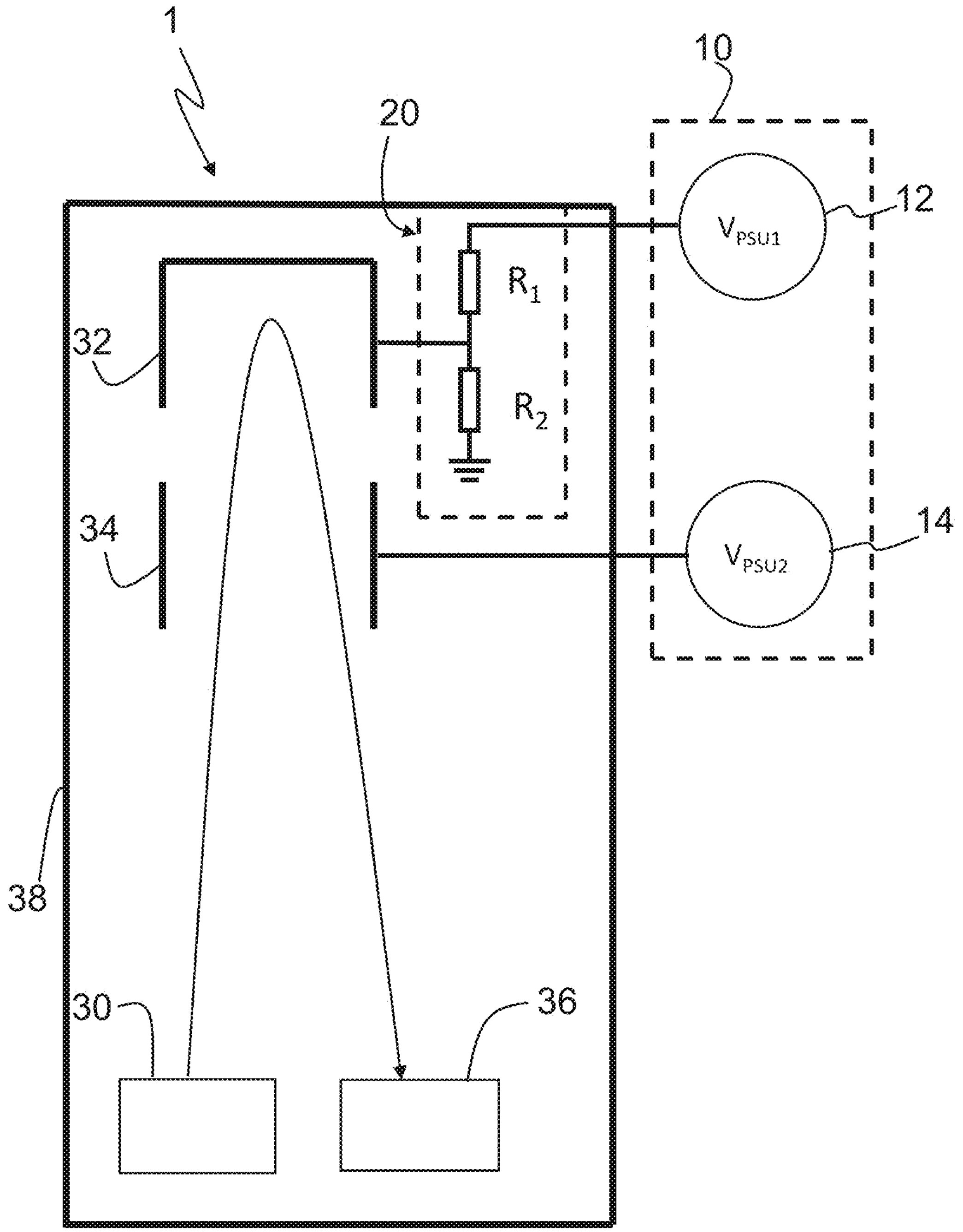
FIG. 1 shows a schematic diagram of a mass analyser including a resistive divider.

According to an embodiment of the disclosure, a mass analyser is provided 1. A schematic diagram of the mass analyser 1 is shown in FIG. 1. As shown in FIG. 1, the mass analyser 1 is connected to a voltage supply 10. As shown in FIG. 1, the voltage supply 10 comprises a first voltage source 12, and a second voltage source 14. The TOF mass analyser 1 comprises an ion source 30, a first electrode 32, a second electrode 34, an ion detector 36 and a flight chamber 38.

The mass analyser 1 shown schematically in FIG. 1 is a Time of Flight (TOF) mass analyser. While the description of the embodiment of the invention is provided in relation to the embodiment of FIG. 1, it will be appreciated that the invention may be applied to any mass analyser incorporating electrodes which may be subject to mass shifts resulting from thermal expansion of the mass analyser.

The mass analyser 1 of FIG. 1 includes an ion source 30. The ion source 30 is configured to output ions along an ion flight path. The ion flight path is shown in the schematic diagram of FIG. 1. The ion flight path extends from the ion source 30 into a flight chamber 38 of the mass analyser 1. The first electrode 32 and the second electrode 34 are arranged in the flight chamber 38 as an ion mirror. The ion mirror is configured to reflect ions back towards the entrance to the flight chamber 38, where an ion detector 36 is located. The ion mirror is configured to receive an output voltage from the resistive divider 20. The principals of operating a TOF mass analyser including one or more ion mirrors is known the skilled person, and so is not described in further detail herein.

The flight chamber 38 of the mass analyser 1 provides a volume in which ions can travel. In some embodiments, the flight chamber 38 may be a vacuum chamber (or at least part of a vacuum chamber). The vacuum chamber may be held at a pressure of about $10^{-5}$-$10^{-6}$ mbar in order to allow ions to travel along the ion flight path. As shown in FIG. 1, the first electrode 32 and the restive divider 20 are provided within the vacuum chamber (flight chamber 38).

The ion source 30 which outputs ions into the mass analyser 1 may be any suitable source of ions. For example, the ion source 30 may comprise an ion trap (not shown) which accumulates ions prior to their output into the mass analyser 1. The ion trap may in turn may be connected to other ion optics components of a mass spectrometry system or the like which is configured to generate and transport ions to the ion trap, such as an electrospray ion source.

In order to reflect the ions travelling along the ion flight path back towards the ion detector 38, the first and second electrodes 32, 34 are connected to first and second voltage sources 12, 14 respective of the voltage supply 10. The voltage supply 10 of FIG. 1 comprises first and second voltage sources 12, 14 configured to output respective first and second supply voltages ($V_{PSU1}$, $V_{PSU2}$). In some embodiments, the first and second supply voltages $V_{PSU1}$, $V_{PSU2}$ may be the same, while in other embodiments the first and second supply voltages $V_{PSU1}$, $V_{PSU2}$ may be different. It will also be appreciated that the voltage supply 10 may also be configured to output other voltages for use by the mass analyser 10 which are not depicted in the schematic diagram of FIG. 1. In some embodiments, the voltage supply 10 comprises a temperature control circuit (not shown) configured to control the first and second supply voltages $V_{PSU1}$, $V_{PSU2}$. It will be appreciated that the any temperature control of the voltage supply 10 is independent of the temperature of the mass analyser 1, as the temperature of the voltage supply 10 may vary independently of the temperature of the mass analyser 1 (e.g. due to the voltage supply generating heat during operation).

In the embodiment of FIG. 1, the first voltage source 12 is connected to the first electrode 32 via a resistive divider 20. The resistive divider 20 comprises a first resistor R 1 and a second resistor $R_2$. It is well known that for a resistive divider of the form shown in FIG. 1, where in-series resisters $R_1$ and $R_2$ separates the first supply voltage $V_{PSU1}$ from ground, the resistive divider voltage ($V_1$) between the resisters, delivered to the first electrode 32, is equal to $V_{PSU}$ multiplied by the proportion of the total resistance within $R_2$: ($R_2/(R_1+R_2)$). As such, the resistive divider 20 in FIG. 1 is configured to receive an input voltage (first supply voltage $V_{PSU1}$) from the voltage supply 10 and output the output voltage (the resistive divider voltage $V_1$) to the first electrode 32. It will be appreciated that due to the presence of the resistive divider 20, the output voltage $V_1$ is different to the input voltage $V_{PSU1}$.

As indicated schematically in FIG. 1, the resistive divider 20 is thermally coupled to the mass analyser 1. As such, the resistors $R_1$, $R_2$ of the resistive divider 20 are thermally coupled to the mass analyser 1. Thus, any changes in the temperature of the mass analyser 1 will be mirrored by corresponding changes in temperature of the resistors $R_1$, $R_2$. It will be appreciated that other parts of the mass spectrometry system, for example the voltage supply 10 may not be thermally coupled to the mass analyser 1. As such, changes in the temperature of the mass analyser may not affect changes in the temperature of the voltage supply 10. Indeed the voltage supply 10 may generate heat independently of the mass analyser 1 during operation.

The first and second resistors $R_1$, $R_2$ may be thermally coupled to any suitable part of the mass analyser 1. Preferably the first and second resistors $R_1$, $R_2$ are thermally coupled to a part of the mass analyser 1 which is susceptible to a relatively significant amount of thermal expansion. In the embodiment of FIG. 1, the resistive divider 20 is mounted on a wall of the flight chamber 38 of the mass analyser 1. In some embodiments, the resistive divider 20 may be thermally coupled to an electrode of the mass analyser 1 (e.g. the first electrode 32) such that the temperature of the resistive divider 20 more accurately tracks the temperature of the first electrode 32, thereby improving the accuracy of the thermal compensation. For example, the resistive divider 20 may be mounted on the first electrode 32 using a suitable fixing (e.g. bolts, solder, or a dedicated fitting). The design and operation of the resistive divider 20 will be discussed in further detail below.

In the embodiment of FIG. 1, the second voltage source 14 is connected directly to the second electrode 34. As such, in the embodiment of FIG. 1, the second voltage output by the second voltage source 14 is conducted directly to the second electrode 34. In other embodiments, it will be appreciated that the electrical connection between the second voltage source 14 and the second electrode 32 may be provided by a resistive divider 20 (i.e. a second resistive divider). The second resistive divider may have a different design (i.e. different resistors) to the (first) resistive divider 20 connected to the first electrode 32.

For the mass analyser 1 of FIG. 1, the mass of an ion is determined based on the time taken for the ion to travel from the ion source 30 to the ion detector 36. Ions with higher mass take longer to transit from the ion source 30 to ion detector 36 than ions with lower mass. The time taken depends on the mass of the ion, as well of the magnitudes of the voltages applied to the first and second electrodes 32, 34. In general, the voltages applied to the first and second electrodes 32, 34 are calibrated in advance of an analysis such that they are known (and generally held constant during an analysis). This in turn allows the mass of the ion to be inferred from the flight time.

The calibration of the mass analyser 1 is also performed at a known temperature of the mass analyser 1. In the embodiment of FIG. 1, an increase in temperature (from the calibration temperature) will cause the mass analyser 1 to thermally expand. Thermal expansion of the mass analyser 1 may cause an unintended increase in the length of the flight path, which in turn increases the flight time for ions travelling along the ion flight path. As such, thermal expansion of the mass analyser 1 increases the flight time for an ion of a given mass. That is to say, an increase in temperature of the mass analyser 1 results in a positive shift in the mass determined by the mass analyser 1. The amount of mass shift that occurs when the temperature of the mass analyser is perturbed can be calculated by mass analysing an ion of known mass using the mass analyser 1 under two different temperatures (e.g. the calibration temperature and a higher temperature) and determining the resulting mass shift (as a percentage of the known mass of the ion). Based on the mass shift and the temperature difference, a relationship between temperature and the resulting mass shift may be determined. That is to say, the mass analyser 1 has a first mass shift per Kelvin perturbation $\Delta_{T1}$ associated with it (i.e. the amount of mass shift caused by a 1 K perturbation to the temperature). For example, the mass analyser 1 may have first mass shift per Kelvin perturbation $\Delta_{T1}$ of +25 ppm/K. In such a case, a +1 Kelvin increase in temperature would cause a shift in the measured mass of an ion by +25 ppm (parts per million, i.e. 0.0001%). Correspondingly, a −0.04 K temperature perturbation (i.e. a decrease in temperature) would cause a shift in the measured mass of an ion by −1 ppm.

It will be appreciated that any changes to the voltages applied to the first and second electrodes 32, 34 may also cause a change in the flight time of the ion, and consequently a change in the determined mass of the ion.

In the embodiment of FIG. 1, the first electrode 32 acts as an ion mirror to reflect ions back towards the entrance of the ToF. For positively charged ions, a positive first voltage $V_1$ is applied to the first electrode 32. A positive perturbation to $V_1$ has the effect of increasing the repulsive potential of the first electrode, thus effectively shortening the ion flight path for an ion of a given mass (i.e. a reduction in flight time for an ion). That is to say, a positive perturbation to the first voltage $V_1$ results in a negative shift in the mass determined (relative to the mass that would be determined in the absence of the voltage perturbation). The amount of mass shift that occurs when the first voltage is perturbed can be calculated by mass analysing an ion of known mass using the mass analyser 1 under two different first voltages $V_1$ and determining the resulting mass shift (as a percentage of the known mass of the ion). Based on the mass shift and the voltage difference, a relationship between the first voltage $V_1$ applied to the first electrode and resulting mass shift may be determined. That is to say, the first electrode 32 has a first mass shift per volt perturbation $\Delta_{V1}$ associated with it (i.e. the amount of mass shift caused by a 1 V perturbation to the voltage applied to the first electrode). For example, the first electrode 32 may have first mass shift per volt perturbation $\Delta_{V1}$ of −10.7 ppm/mV. In such a case, a −10.7 mV voltage perturbation would cause a shift in the measured mass of an ion by +1 ppm (parts per million, i.e. 0.0001%). Correspondingly, a +10.7 mV voltage perturbation would cause a shift in the measured mass of an ion by −1 ppm.

In the embodiment of FIG. 1, the resistive divider 20 is designed to counteract the first mass shift per Kelvin resulting from the mechanical thermal expansion of the mass analyser 1. Specifically, the temperature coefficients of the resistors of the resistive divider 20 are selected to provide the desired compensation. For the resistive divider 20 of FIG. 1, it will be appreciated that when both resistors of the resistive divider 20 are balanced with matching temperature coefficients, the resistance drift on both resistors cancels each other out and the resistive divider 20 is thermally stable. That is to say, the output voltage of the resistive divider does not vary with temperature. In the embodiment of FIG. 1, the first resistor $R_1$ has a first temperature coefficient $C_1$ and the second resistor $R_2$ has a second temperature coefficient $C_2$. By selecting the first and second temperature coefficients of the first and second resistors $R_1$, $R_2$ the resistive divider 20 can be designed to have an output voltage $V_1$ which varies in response to a change in temperature of the resistors. As the resistive divider 20 is thermally coupled to the mass analyser 1, the temperature of the resistors $R_1$, $R_2$ will follow any perturbations to the temperature of the mass analyser 1. Accordingly, the output voltage ($V_1$) of the resistive diver 20 will also be perturbed in response to a temperature perturbation of the mass analyser 1. That is to say, the resistive divider 20 can be designed such that the output voltage has a desired voltage shift per Kelvin. The voltage shift per Kelvin, in combination with the first mass shift per volt perturbation of the first electrode $\Delta_{V1}$, results in the resistive divider 20 effecting a second mass shift per Kelvin $\Delta_{T2}$ at the detector 30. It will be appreciated that the second mass shift per Kelvin $\Delta_{T2}$ can thus be designed to compensate for the first mass shift per Kelvin $\Delta_{T1}$ of the mass analyser 1.

In relation to the embodiment of FIG. 1, the first mass shift per Kelvin $\Delta_{T1}$ to be compensated is +25 ppm/K. Such a first mass shift per Kelvin would be expected for a mass analyser 1 constructed principally from stainless steel. For the first electrode 32 (having a $\Delta_{V1}$ of −10.7 ppm/mV) the voltage must drift +267.5 mV with a 1 Kelvin temperature change to produce the −25 ppm shift desired to compensate for the +25 ppm/K first mass shift. Assuming that the output voltage $V_1$ is to be +6500 V, the desired resistive divider drift is therefore +41.2 ppm/K (i.e. 0.0000412%/K). In the embodiment of FIG. 1, the first voltage source 12 provides an input voltage of 10,000 V. Thus, assuming that the resistive divider uses first and second resistors where $R_1$=35

MΩ and $R_2$=65 MΩ, and the temperature coefficient for the first resistor $C_1$ is selected as +5 ppm/K, then it follows that the second temperature coefficient $C_2$ for the second resistor $R_2$ must be +122.6 ppm/K to provide exact compensation. It will be appreciated that a second resistor $R_2$ having second temperature coefficient $C_2$ close to the ideal value (e.g. a positive temperature coefficient below +122.6 ppm/K) will provide partial compensation of the first mass shift per Kelvin $\Delta_{T1}$. Accordingly, the combination of the first and second mass shifts per Kelvin ($\Delta_{T1}+\Delta_{T2}$) gives the overall mass shift per Kelvin of the mass analyser 1. In some embodiments, a magnitude of the combination of the first and second mass shifts per Kelvin is no greater than 5 ppm/K, 3 ppm/K, or 1 ppm/K. That is to say, the resistive divider 20 may be designed to reduce the overall mass shift per Kelvin of the mass analyser by at least an order of magnitude (relative to $\Delta_{T1}$), thereby improving the accuracy of the mass analyser 1.

Thus, it will be appreciated that the resistive divider 20 provides a passive method of temperature compensation for the mass analyser 1. As such, the temperature compensation does not require any active control of the resistive divider 20 or real-time sensing of the temperature of the mass analyser 1. Rather, the resistive divider 20 is thermally coupled to the mass analyser 1 such that any changes in temperature of the mass analyser 1 are also experienced by the resistive divider 20.

It will be appreciated that in the above example, each of the first and second resistors $R_1$ and $R_2$ were indicated to be a single resistor. In other embodiments, one or more of the first and second resistors $R_1$, $R_2$ may be provided as a plurality of resistive components.

It will be appreciated that in the embodiment of FIG. 1, the second electrode 34 can be biased to increase the time of travel of ions through the mass analyser 1. As such, a positive voltage perturbation applied to the second electrode 34 results in an increase in the mass of the ion measured by the mass analyser 1. That is to say, the second electrode 34 has a second mass shift per volt perturbation $\Delta_{V2}$ associated with it that is opposite to that of the first electrode 32. The second mass shift per volt $\Delta_{V2}$ perturbation characteristic for the second electrode 34 may be determined in a similar manner as described above for the first electrode 32. For example, the second mass shift per volt perturbation characteristic associated with the second electrode $\Delta_{V2}$ may be +42.6 ppm/mV. As such, a voltage perturbation of +42.6 mV applied to the second electrode results in a +1 ppm shift in the mass measured by the mass analyser 1.

In the embodiment of FIG. 1, the second voltage source 14 is connected directly to the second electrode 34. As such, in the embodiment of FIG. 1, the second voltage output by the second voltage source 14 is conducted directly to the second electrode 34. In other embodiments, it will be appreciated that the electrical connection between the second voltage source 14 and the second electrode 32 may be provided by a resistive divider 20 in addition to, or as an alternative to the resistive divider 20 connected to the first electrode 32. As such, compensation of the mechanical thermal drift of the mass analyser 1 may involve using resistive dividers connected to a plurality of electrodes 32, 34 in order to provide a desired level of compensation.

According to a second embodiment of the disclosure, a multiple reflection time of flight mass analyser (MRTOF) 100 is provided. A schematic diagram of the MRTOF 100 and a connected voltage supply 110 is shown in FIG. 2.

The MRTOF 100 comprises a first converging ion mirror 102 and a second converging ion mirror 104. The first and second converging ion mirrors 102, 104 are arranged opposite each other in order to define an ion flight path which involves multiple reflections between the first and second converging ion mirrors 102, 104. As further shown in FIG. 2, ions are input into the MR-ToF 100 from an ion trap source 130. The ions travel from the ion trap source 130 through a first out-of-plane lens 131, a first deflector 132, a second out-of-plane-lens 133, and a second deflector 134, before travelling between the converging ion mirrors 102, 104. Ions leaving the MRTOF 100 are captured by an ion detector 136. The flight path of ions through the MRTOF 100 from the ion trap source 130 to the ion detector 136 is indicated schematically in FIG. 2.

Figure 2:
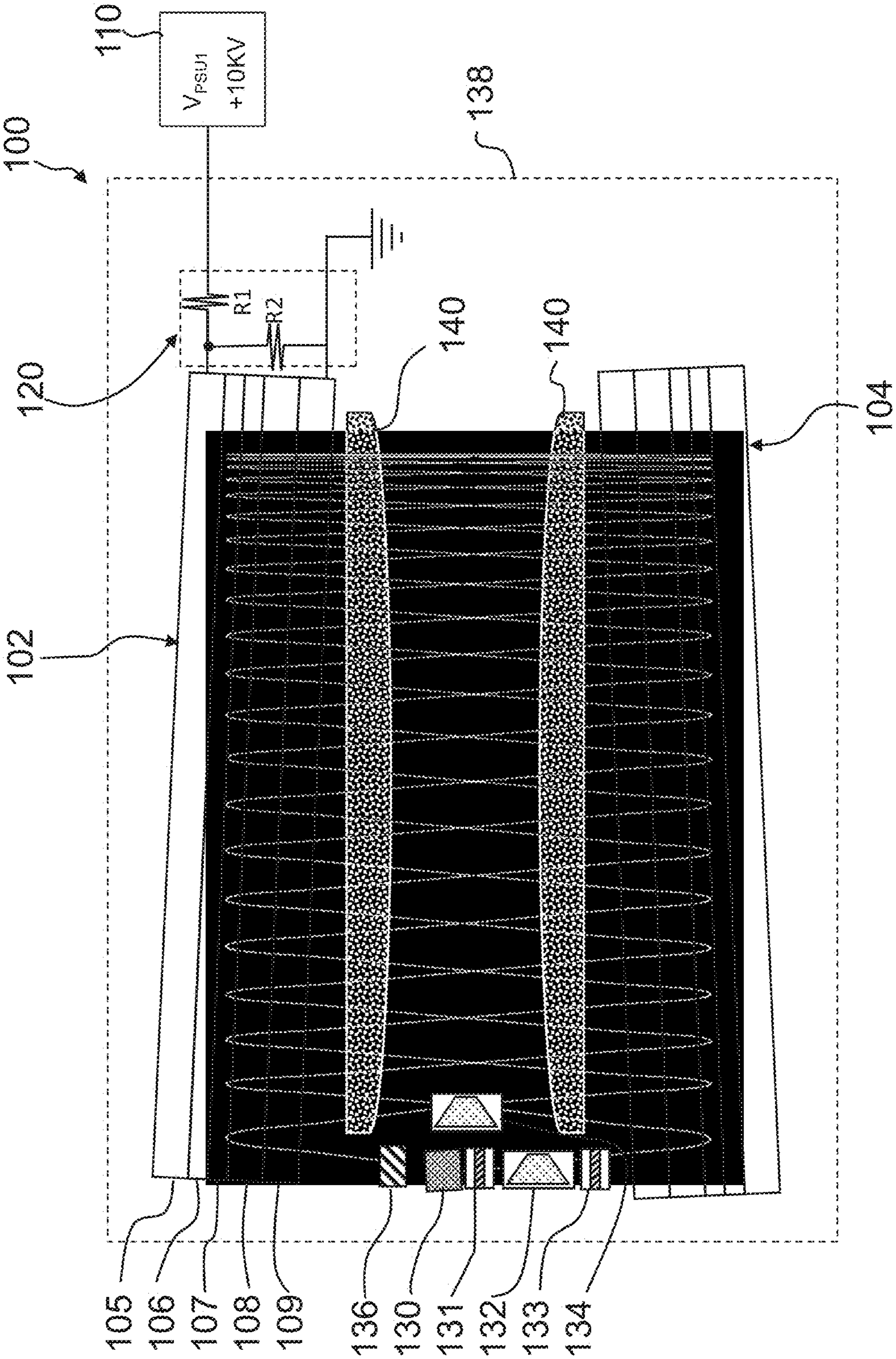
FIG. 2 shows a schematic diagram of a multiple reflection Time of Flight mass analyser including a resistive divider.

In FIG. 2, the first converging ion mirror 102 comprises five mirror electrodes 105, 106, 107, 108, 109. Each of the five mirror electrodes 105, 106, 107, 108, 109 has an associated mass shift per volt perturbation ($\Delta_{V1}$, $\Delta_{V2}$, $\Delta_{V3}$, $\Delta_{V4}$, $\Delta_{V5}$). The second converging ion mirror 104 may be provided with five mirror electrodes of a similar construction.

As shown in FIG. 2, the first and second converging ion mirrors 102, 104 are each connected to a voltage supply 110. The voltage supply 110 is shown schematically in FIG. 4 as being connected to the fourth mirror electrode 109 of the first converging ion mirror 102 via a resistive divider 120. The resistive divider 120 is thermally coupled to the MRTOF 100 in a similar manner to the resistive divider 20 in the embodiment of FIG. 1. For example, the resistive divider 120 may be provided within the vacuum chamber of the MRTOF 100. It will be appreciated that the voltage supply 110 is connected to each of the mirror electrodes 105, 106, 107, 108, 109 (either directly connected or via a respective resistive divider 120) in order to supply a desired DC voltage to each of the mirror electrodes 105, 106, 107, 108, 109. It will be appreciated that the mirror electrodes of the second converging ion mirror 104 are also each connected to a voltage supply (not shown in FIG. 2), which may be the same voltage supply 110, or a different voltage supply.

As shown in FIG. 2, a pair of correction stripe electrodes 140 may also be provided between the ion mirrors 102, 104. Correction stripe electrodes are described in further detail in U.S. Pat. No. 9,136,101.

As set out in Table 1 below, the five mirror electrodes 105, 106, 107, 108, 109 of the first converging ion mirror 102 are to be provided with the following input voltages (V) and have the following associated mass shift per volt perturbations ($\Delta_V$).

TABLE 1

| Electrode | Absolute Voltage (V) | Mass shift per volt perturbation ΔV (ppm/mV) |
|---|---|---|
| First mirror electrode 105 | +6500 | −10.7 |
| Second mirror electrode 106 | +3650 | −12.5 |
| Third mirror electrode 107 | +4600 | +142.1 |
| Fourth mirror electrode 108 | −7350 | +42.6 |
| Fifth mirror electrode 109 | 0 | N/A |

The MRTOF 100 of FIG. 2 may be provided in a flight chamber 138, for example a vacuum chamber similar to the flight chamber 38 discussed above for the embodiment of FIG. 1. Similar to the mass analyser of FIG. 1, the MRTOF 100 of FIG. 2 will have a first mass shift per Kelvin ($\Delta_{T1}$) due to thermal expansion (or contraction) of the components (and their relative spacing). For example, where the MRTOF

100 is constructed mainly of stainless steel, the first mass shift per Kelvin $\Delta_{T1}$ may be about +25 ppm/K.

Similar to the first embodiment, the resistive divider 120 may be designed, in conjunction with the voltage supply 110 to provide the desired output voltage $V_1$=+6500 V to the first electrode 105 while the resistors of the resistive divider 120 have temperature coefficients selected to provide a second mass shift per Kelvin ($\Delta_{T2}$) which compensates for the first mass shift per Kelvin ($\Delta_{T1}$).

In the embodiment of FIG. 2, the voltage supply 110 provides an input voltage $V_{PSU1}$ to the resistive divider 120 of +10 kV. The resistances of the first and second resistors $R_1$, $R_2$ are selected to ensure that the output voltage V4 is the desired +6500 V. High resistances are preferred for dividing high voltages without excess current draw, so a preferable choice for resistances $R_1$ and $R_2$ may be 35 MΩ and 65 MΩ respectively. If desired, the voltage applied to the first electrode 105 may be further controlled by varying the supply voltage $V_{PSU1}$ provided by the voltage supply 110.

In relation to the embodiment of FIG. 2, the first mass shift per Kelvin $\Delta_{T1}$ to be compensated is +25 ppm/K. For the first electrode 105 (having a $\Delta_{V1}$ of −10.7 ppm/mV) the voltage must drift +267.5 mV with a 1 Kelvin temperature change to produce the −25 ppm shift required to compensate for the +25 ppm first mass shift. Assuming that the output voltage $V_1$ is to be +6500 V, the desired resistive divider drift is therefore +41.2 ppm/K (i.e. 0.0000412%/K). In the embodiment of FIG. 1, the first voltage source 12 provides an input voltage of 10,000 V. Thus, given that the resistive divider 120 uses first and second resistors where $R_1$=35 MΩ and $R_2$=65 MΩ, and where the temperature coefficient for the first resistor $C_1$ is selected as +5 ppm/K, then it follows that the second temperature coefficient $C_2$ for the second resistor $R_2$ should be +122.6 ppm/K to provide exact compensation. It will be appreciated that a second resistor $R_2$ having second temperature coefficient $C_2$ close to the ideal value (e.g. a positive temperature coefficient below +122.6 ppm/K) will provide partial compensation of the first mass shift per Kelvin $\Delta_{T1}$.

It will be appreciated that the combination of the first and second mass shifts per Kelvin ($\Delta_{T1}+\Delta_{T2}$) gives the overall mass shift per Kelvin of the mass analyser 1. Assuming that appropriate temperature coefficients are chosen for $R_1$ and $R_2$, the associated $\Delta_{T2}$ of the resistive divider 120 reduces the magnitude of the overall mass shift per Kelvin of the MRTOF 100 (relative to the uncompensated mass analyser $\Delta_{T1}$). As for the mass analyser 1 of FIG. 1, in some embodiments a magnitude of the combination of the first and second mass shifts per Kelvin is no greater than 5 ppm/K, 3 ppm/K, or 1 ppm/K. That is to say, the resistive divider 120 may be designed to reduce the overall mass shift per Kelvin of the MRTOF 100 by at least an order of magnitude (relative to $\Delta_{T1}$), thereby improving the accuracy of the MRTOF 100.

In the embodiment of FIG. 2, the voltage source 110 may also be configured to supply voltages to the other electrodes 106, 107, 108, 109. The voltage source 110 may provide the desired voltages directly to the respective electrodes 106, 107, 108, 109. Alternatively, one or more of the connections to the other electrodes 106, 107, 108, 109 may be provided by a resistive divider 120 in addition to, or as an alternative to the resistive divider 120 connected to the first electrode 105. As such, compensation of the mechanical thermal drift of the MRTOF 100 may involve using resistive dividers 120 connected to a plurality of electrodes 105, 106, 107, 108, 109 in order to provide a desired level of compensation for the first mass shift per Kelvin. In the embodiment of FIG. 2, the voltage supply 110 is only shown schematically for the first electrode of the first ion mirror 102. In some embodiments, the second ion mirror 104 may also have a similar voltage supply 110 to the first ion mirror 102, including one or more resistive dividers 120 thermally coupled to the MRTOF 100. Thus, thermal compensation of the MRTOF 100 may in some embodiments be performed by only one ion mirror 102, or through a combination of thermal compensation from both ion mirrors 102, 104.

According to another embodiment of the disclosure, a Time of Flight (TOF) mass analyser 200 is provided. The TOF mass analyser 200 comprises an ion source 230, a detector 236, and a compensation electrode 250. A schematic diagram of the TOF mass analyser 200 at a first temperature is shown in FIG. 3*a* and a schematic diagram of the TOF mass analyser 200 at a second higher temperature is shown in FIG. 3*b*.

Figure 3A:
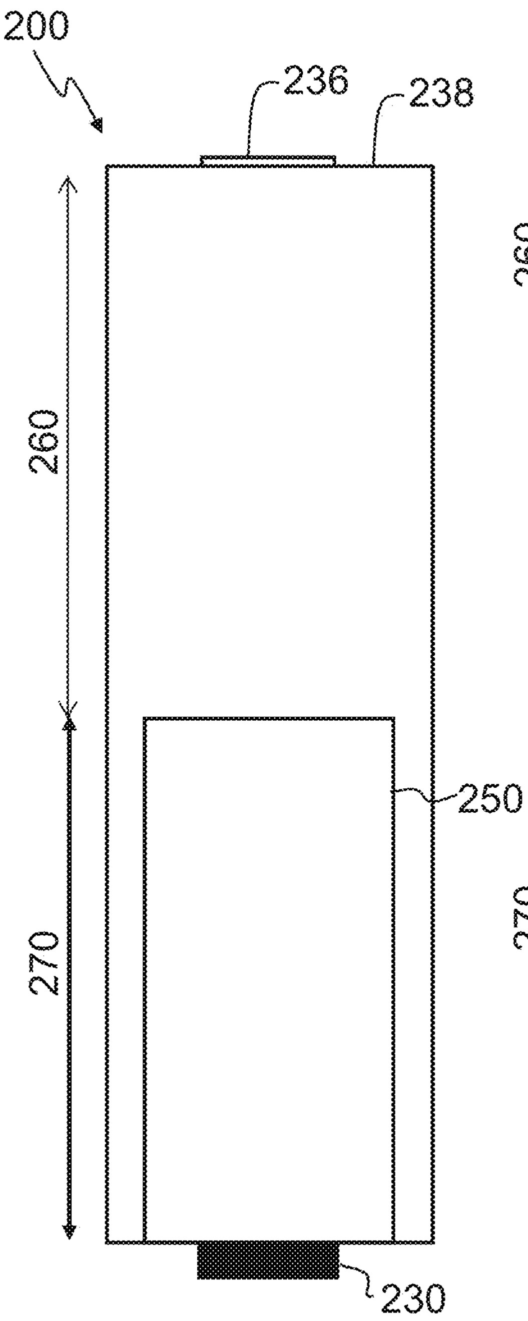
FIG. 3*a* shows a schematic diagram of a TOF mass analyser including a compensation electrode at a first temperature.
Figure 3B:
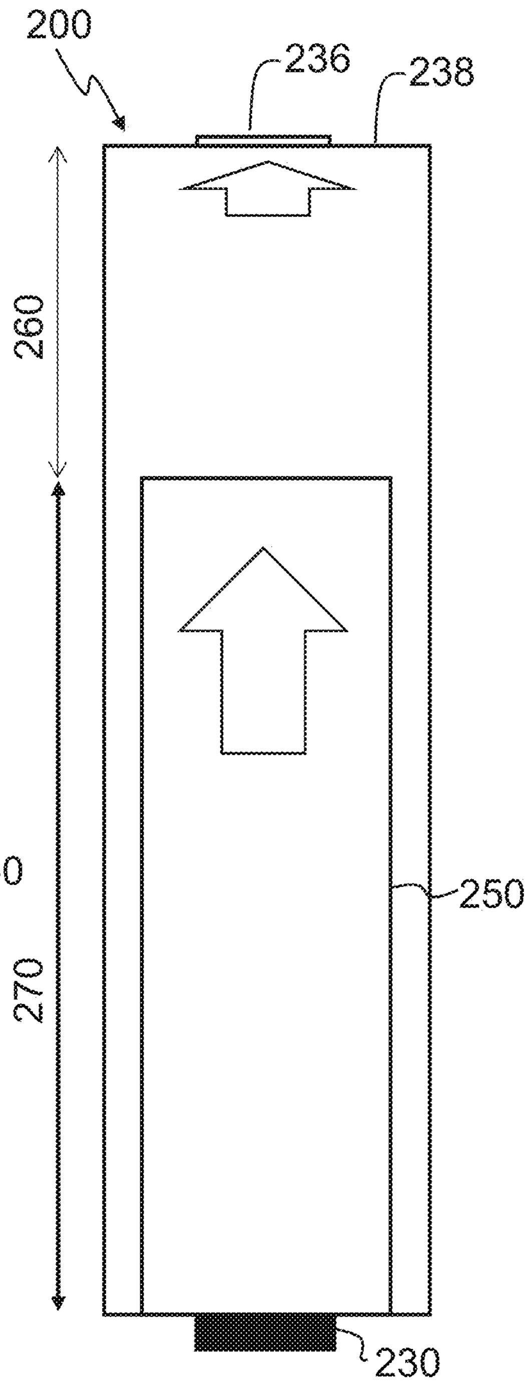
FIG. 3*b* shows a schematic diagram of a TOF mass analyser including a compensation electrode at a second temperature higher than the first mass analyser.

As shown in FIG. 3*a*, the ion source 230 and the detector 236 are arranged to define an ion flight path from the ion source 230 to the detector 236. The ion source 230 and the detector 236 are located at opposing ends of a flight chamber 238, which may be a vacuum chamber. The TOF mass analyser 200 of FIGS. 3*a* and 3*b* is a TOF mass analyser 200 in which ions travel in an elongated direction along an ion flight path from one end of an elongated flight chamber 238 to the other opposing end.

The ion flight path comprises a first region (a low speed region 260) and a second region (a high speed region 270). FIG. 3*a* shows the TOF mass analyser 200 at a first temperature. FIG. 3*b* shows the TOF mass analyser 200 at a second temperature, higher than the first temperature. It will be appreciated that the increase in temperature causes the TOF mass analyser 200 to thermally expand. Thus, FIG. 3*b* indicates the effect of thermal expansion of TOF mass analyser 200 in the elongate direction of the ion flight path (exaggerated for the purposes of explanation). As will be appreciated from the above discussion, thermal expansion of the TOF mass analyser 200 (e.g. thermal expansion of the flight chamber 238) causes an increase in the flight path length, and thus flight time for ions of a given mass. As such, thermal expansion of the TOF mass analyser 200 results in a first mass shift per Kelvin (am) of ions detected at the detector 236. For example, in the embodiment of FIGS. 3*a* and 3*b* the flight chamber 238 may have a length of 1.2 m and be formed substantially from invar. Accordingly, the thermal expansion of the flight chamber 238 (and thus the length of the flight path) may be essentially the thermal expansion coefficient of invar. That is to say, a thermal expansion coefficient of the length of the flight path may be substantially that of the material defining the length of the flight path (e.g. invar in the embodiment of FIG. 3*a*). As such, thermal expansion of the TOF mass analyser 200 may have a first mass shift per Kelvin ($\Delta_{T1}$) of about 1.2 ppm/K. It will be appreciated that in the simple embodiment of FIGS. 3*a* and 3*b*, the first mass shift per Kelvin is based on the thermal expansion of the flight chamber 238. In other embodiments, other factors may also influence the first mass shift per Kelvin associated with mechanical thermal expansion of a mass analyser.

In order to compensate for the effect of thermal expansion of the TOF mass analyser 200, the TOF mass analyser includes a compensation electrode 250. The compensation electrode 250 is arranged along the ion flight path in the high speed region 270. In the embodiment of FIGS. 3*a* and 3*b*, the compensation electrode 250 extends in the elongate direction along a portion of the ion flight path (but not the complete length). For example, in the embodiment of FIG.

3*a*, the compensation electrode extends along no more than 50% of the length of the ion flight path. The portion of the ion flight path along which the compensation electrode 250 extends defines the high speed region 270 of the ion flight path.

In the embodiment of FIGS. 3*a* and 3*b*, the compensation electrode 250 is a cylindrical electrode which is elongated in the elongate direction of the flight chamber 238. The ion flight path extends along a central axis of the cylindrical compensation electrode 250. The skilled person will understand that various forms of compensation electrode 250 may be provided in order to provide a high speed region along the ion flight path. For example, in some embodiments a pair of opposing plate electrodes may be provided as the compensation electrode 250.

The compensation electrode 250 is configured to cause ion travelling along the ion flight path in the high speed region to travel at a higher speed than the low speed region 260. As such, the compensation electrode 250 is configured to accelerate the ions travelling along the ion flight path. The compensation electrode 250 may cause ions to travel at a higher speed by application of a suitable voltage to the compensation electrode 250 from a voltage supply (not shown).

The compensation electrode 250 is thermally coupled to the TOF mass analyser 200. Thus, as shown in FIG. 3*b*, as the TOF mass analyser 200 thermally expands due to a change in temperature, the compensation electrode 250 also thermally expands. So, as shown in FIG. 3*b*, the length of the compensation electrode 250 in the elongate direction increases due to thermal expansion. The compensation electrode 250 is mounted in the flight chamber 238 such that thermal expansion of the compensation electrode 250 does not cause an increase in the ion flight path length (defined by the spacing between the ion source 230 and the detector 236). For example, the compensation electrode 250 may be suspended in the flight chamber 238 such that the compensation electrode 250 is free to thermally expand without impacting the ion flight path length. For example, the compensation electrode 250 may be suspended in the flight chamber 238 by fixing the compensation electrode 250 to the flight chamber 238 at one point, rather than a plurality of points. In other embodiments, the compensation electrode 250 may be mounted at one end of the flight chamber 238, wherein the compensation electrode 250 is then free to thermally expand towards the other end of the flight chamber 238.

The compensation electrode 250 is selected to have a thermal expansion coefficient ($C_{electrode}$) such that thermal expansion of the compensation electrode 250 causes a second mass shift per Kelvin $\Delta_{T2}$ of ions detected at the detector which compensates for the first mass shift per Kelvin $\Delta_{T1}$. For example, in the embodiment of FIGS. 3*a* and 3*b*, the compensation electrode 250 may be formed from aluminium having a thermal expansion coefficient of 25 ppm/K. The choice of material for the compensation electrode 250 may be chosen to achieve a desired thermal compensation. In the embodiment of FIGS. 3*a* and 3*b*, a material with a different thermal expansion coefficient is chosen for the compensation electrode 250 to the thermal expansion coefficient associated with the ion flight path length of the TOF mass analyser 200 (invar: 1.2 ppm/K).

As an example, in the embodiment of FIGS. 3*a* and 3*b*, the compensation electrode 250 is designed to extend 0.5 m in the elongate direction of the flight chamber 238 (the flight chamber 238 having a length of 1.2 m between the ion source 230 and the detector 236). By applying suitable voltages to the TOF mass analyser 200, ions of mass to charge ratio (m/z) 200 amu are accelerated to about 7000 eV energy through the low speed region 260, and to 8600 eV through the high speed region 270 defined by the compensation electrode 250. Ions may be accelerated to the desired energies by application of suitable voltages to the TOF mass analyser 200. Accordingly, the speed of the ions through the low speed region 260 will be 82.196 km/s. The speed of the ions through the high speed region 270 will be 91.107 km/s. Based on the compensation electrode 250 described above, at the first temperature of FIG. 3*a*, the time-of-flight through the low speed region 260 is 6.08302 μs and the time of flight through the high speed region 270 is 5.48806 μs (a total flight time of 11.571086 μs).

Under an increase in temperature of 10 K, the TOF mass analyser 200 thermally expands as shown in FIG. 3*b*. In particular, the flight chamber 238 expands by 12 μm in the elongate direction and the compensation electrode 250 expands by 125 μm. Accordingly, the length the low speed region 260 of the ion flight path actually shrinks by 113 μm due to the relatively larger thermal expansion of the compensation electrode 250 (and thus the expansion of the high speed region 270). Thus, at the second temperature, the time-of-flight in the low speed region 260 becomes 6.08165 μs and the time of flight in the high speed region is 5.48944 μs. Thus, the total flight time at the second temperature is 11.571083 μs, almost completely unchanged from the total flight time at the first temperature. As such, the compensation electrode 250 introduces a second mass shift per Kelvin ($\Delta_{T2}$) of about −1.174 ppm/K such that the overall mass shift per Kelvin of the TOF mass analyser is about +0.026 ppm/K. As such, it will be appreciated that the presence of the compensation electrode 250 reduces the overall mass shift per Kelvin of the TOF mass analyser 200 by at least an order of magnitude (relative to $\Delta_{T1}$), thereby improving the accuracy of the TOF mass analyser 200. In particular, the compensation electrode 250 reduces the overall mass shift per Kelvin to below 1 ppm/K.

In the embodiment of FIGS. 3*a* and 3*b* it will be appreciated that the ion energy in the low speed region 260 is 7000 eV, while the ion energy in the high speed region 270 is designed to be 8600 eV (by applying a suitable potential to the compensation electrode). It will be appreciated that by increasing the difference in ion energy between the low and high speed regions 260, 270 the thermal compensating effect of the compensation electrode 250 will be increased. As such, one way to compensate for larger first mass shifts per Kelvin $\Delta_{T1}$ is to increase the difference in ion energy between the low and high speed regions 260, 270. For example, the difference in ion energy between the low speed region 260 and the high speed region 270 may be at least: 100 eV, 200 eV, 500 eV, 1000 eV, 2000 eV or 5000 eV. As such, the difference in ion energy between the low and high speed regions 260, 270 amplifies the effect of the difference between the thermal expansion coefficient of the mass analyser 200 and the thermal expansion coefficient of the compensation electrode 250.

It will also be appreciated that the design of the compensation electrode 250, including the relative length of the compensation electrode 250 to the total length of the ion flight path may be taken into account when designing a compensation electrode 250 for a TOF mass analyser. For example, the material for the compensation electrode 250 may be selected based on the thermal expansion coefficient of the material. Possible materials for the compensation electrode 250 include: steel ($C_{electrode}$=25 ppm/K), aluminium ($C_{electrode}$=23 ppm/K), polytetrafluoroethylene ($C_{electrode}$=125 ppm/K) or any other suitable plastic.

As a rough guide, a TOF mass analyser 200 of the form of FIGS. 3*a* and 3*b* with a flight chamber 238 formed from steel and an aluminium compensation electrode 250 would have a low speed region 260 in which ions travel with an ion energy of 300 eV and a high speed region 270 in which ion travel with an energy of 20,000 eV, in order to fully compensate for thermal expansion. Increasing the length of the compensation electrode 250 for such a TOF mass analyser 250 from 0.5 m to 0.75 m would change the required ion energies to about 1500 eV and 8800 eV for the low speed and high speed regions 260, 270 respectively. As such, it will be appreciated that the design of the compensation electrode 250 can be adapted to accommodate a wide range of different mass analyser designs and materials.

It will be appreciated that the thermal compensation provided by the compensation electrode 250 does not require any active control or temperature measurement (i.e. a passive compensation method). While the compensation method is passive, the second mass shift per Kelvin ($\Delta_{T2}$) provided by the compensation electrode 250 is dependent on the voltage applied to the compensation electrode 250. Thus, the second mass shift per Kelvin ($\Delta_{T2}$) can be further calibrated by adjusting the voltage applied to the compensation electrode 250. This in turn allows the temperature compensation to be tuned/calibrated for a specific ion mass to charge ratio and/or for minor variations in the operating condition of the mass analyser in order to further improve the accuracy of the TOF mass analyser 200.

Figure 4A:
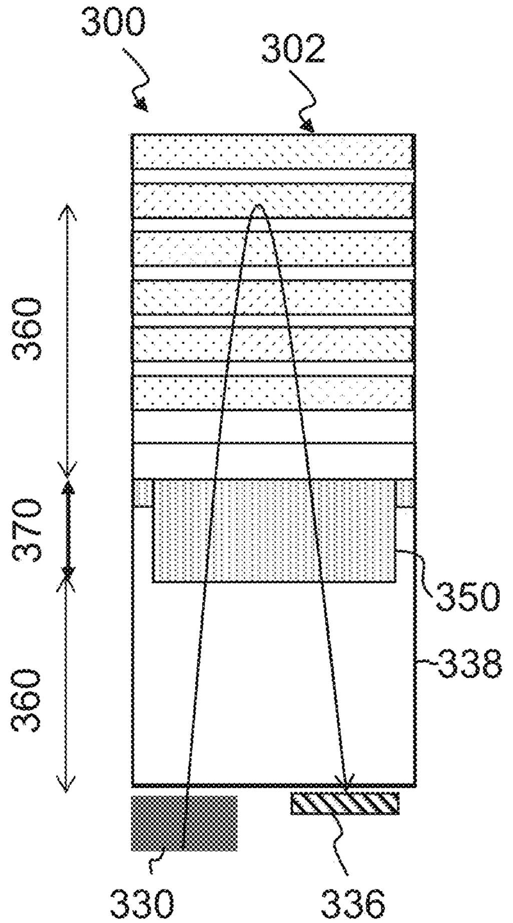
FIG. 4*a* shows a schematic diagram of another TOF mass analyser including a compensation electrode at a first temperature.
Figure 4B:
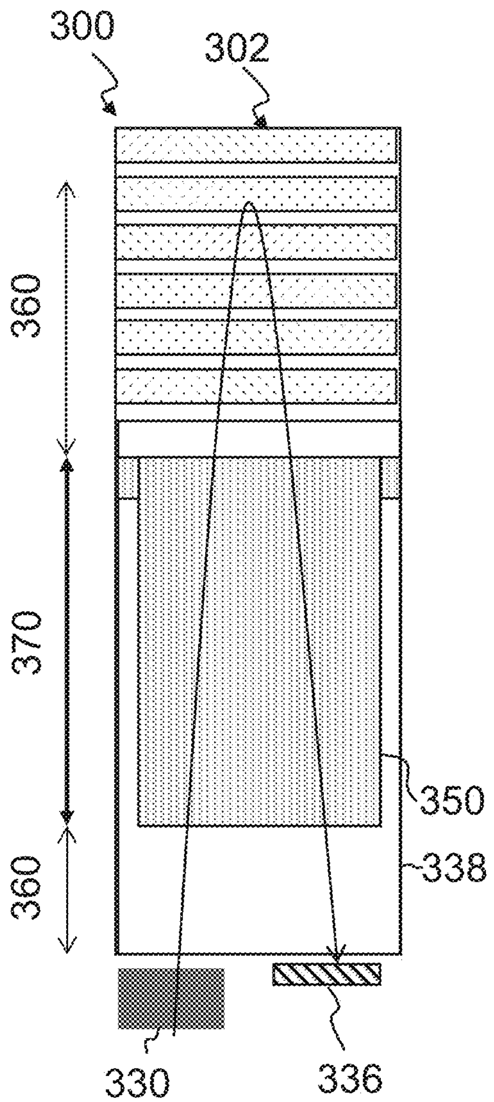
FIG. 4*b* shows a schematic diagram of another TOF mass analyser including a compensation electrode at a second temperature higher than the first mass analyser.

FIGS. 4*a* and 4*b* show a further embodiment of a TOF mass analyser 300 according to this disclosure. The TOF mass analyser 300 comprises an ion mirror 302, an ion source 330, a detector 336, a flight chamber 338, and a compensation electrode 350. The ion source 330, detector 336, flight chamber 338, and compensation electrode 350 may be similar to those provided in the TOF mass analysers 1, 100, 200 discussed in the preceding embodiments. A schematic diagram of the TOF mass analyser 300 at a first temperature is shown in FIG. 4*a* and a schematic diagram of the TOF mass analyser 300 at a second higher temperature is shown in FIG. 4*b*.

As shown in FIG. 4*a*, the ion source 330, the ion mirror 302, and the detector 336 are arranged to define an ion flight path from the ion source 330 to the detector 336 via the ion mirror 302. The ion source 330, ion mirror 302, and the detector 336 are located in a flight chamber 338, which may be a vacuum chamber. The ion source 330 is configured to inject ions towards the ion mirror 302 which then reflects the ions back to the detector 336. The compensation electrode 350 is arranged between the ion source 330 and the ion mirror 302. In the embodiment of FIGS. 4*a* and 4*b*, the compensation electrode 350 is spaced apart from the ion source 330 along the ion flight path, rather than being adjacent to the ion source 330 (as in the embodiment of FIGS. 3*a* and 3*b*).

The ion mirror 302 is configured to reflect ions travelling from the ion source 330 towards the detector 336. The ion mirror shown in FIGS. 4*a* and 4*b* comprises a plurality of electrodes. As such, the ion mirror 302 may have a similar construction to the ion mirrors 102, 104 shown in the embodiment of FIG. 2.

Similar to the embodiment of FIGS. 3*a* and 3*b*, the ion flight path of the TOF mass analyser 300 comprises high speed regions 370 and low speed regions 360. In the embodiment of FIGS. 4*a* and 4*b*, the ion flight path crosses the compensation electrode 350 when travelling from the ion source 330 to the ion mirror 302 and when travelling from the ion mirror 302 to the detector 336. As such, there are two high speed regions 370 along the ion flight path and low speed regions 360 of the ion flight path on either side of the compensation electrode.

Similar to the embodiment of FIGS. 3*a* and 3*b*, thermal expansion of the TOF mass analyser 300 in FIG. 4*b* causes the length of the flight chamber 338 in an elongate direction to increase. Thus, the spacing between the ion source 330 and the ion mirror 302, and the spacing between the ion mirror 302 and the detector 336 increases, causing an increase in the total ion flight path length and a corresponding first mass shift per Kelvin $\Delta_{T1}$. It will be appreciated that the magnitude of the thermal expansion is exaggerated in FIG. 4*b* for the purpose of explanation.

The compensation electrode 350 is suspended in the flight chamber 338 of the TOF mass analyser 300. As shown in FIG. 4*b*, the compensation electrode 350 thermally expands in response to a temperature change of the TOF mass analyser 300, as the compensation electrode 350 is thermally coupled to the TOF mass analyser 300. The compensation electrode 350 has a thermal expansion coefficient $C_{electrode}$ such that thermal expansion of the compensation electrode 350 causes a second mass shift per Kelvin $\Delta_{T2}$ of ions detected at the detector which compensates for the first mass shift per Kelvin. Depending on the thermal expansion coefficient of the compensation electrode 350 relative to the thermal expansion coefficient of the flight chamber 338, the relative length of the high speed regions 370 to the low speed regions 360 may change as the TOF mass analyser 300 thermally expands (or contracts) in order to compensate for changes in the ion flight path length.

In the embodiment of FIGS. 4*a* and 4*b*, the compensation electrode 350 is suspended in the flight chamber 338 at a location along the ion flight path which is closer to the ion mirror 302 than the ion source 330/detector 336. In some embodiments, it may be preferable to locate the compensation electrode 350 at a location closer towards the detector 336 than the ion mirror, in some embodiments adjacent to the detector 336, in order to improve the collection efficiency of the detector 336. For example, in some embodiments the compensation electrode 350 may be mounted to the detector 336.

In some embodiments, it may be desirable to compensate for relatively large first mass shifts per Kelvin ($\Delta_{T1}$), for example mass shifts in excess of 30 ppm/K. For example, the mass analyser may be constructed from a material having a relatively large thermal expansion coefficient (e.g. aluminium). In such cases, the compensation electrode may be provided as a telescopic compensation electrode 450. An example of a telescopic compensation electrode 450 is shown in embodiment of FIG. 5.

Figure 5:
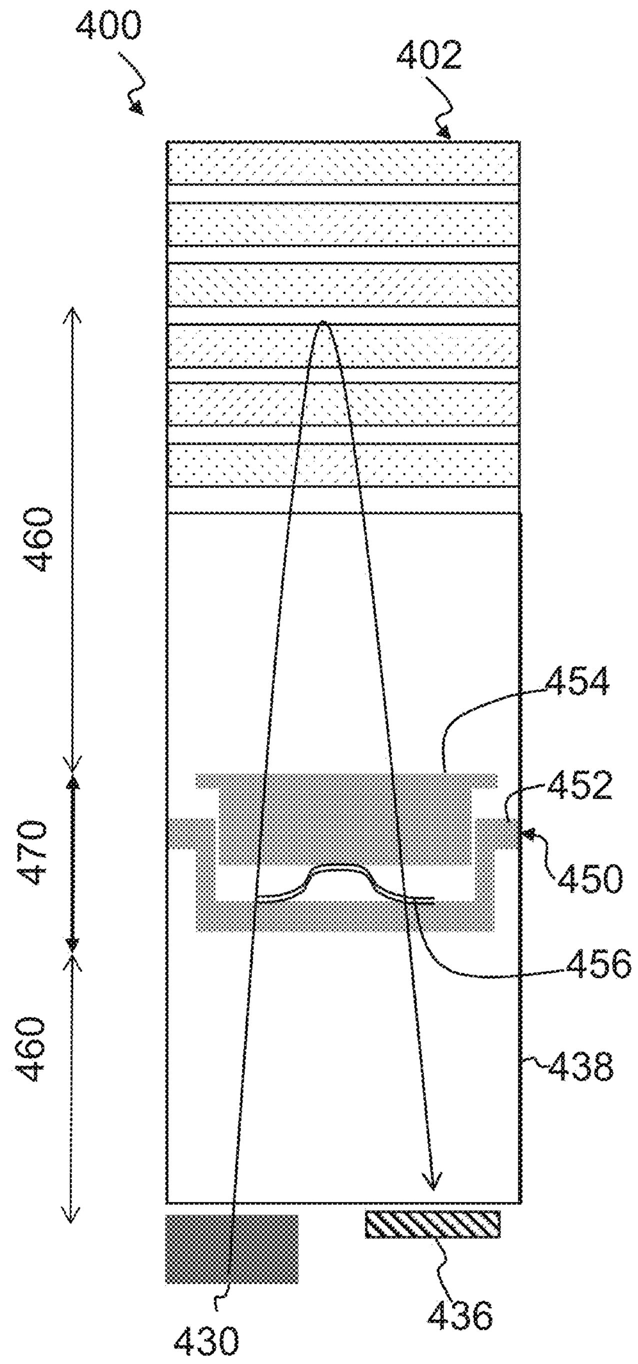
FIG. 5 shows a schematic diagram of a TOF mass analyser comprising a telescopic compensation electrode.

FIG. 5 is a schematic diagram of a TOF mass analyser 400. The TOF mass analyser 400 comprises an ion mirror 402, an ion source 430, a detector 436, a flight chamber 438, and a telescopic compensation electrode 450. The arrangement of the various components is similar to those of the TOF mass analyser 300 discussed above.

The telescopic compensation electrode 450 is arranged in the TOF mass analyser 400 in a similar location to the compensation electrode 350 shown in FIGS. 3*a* and 3*b*. As such, the telescopic compensation electrode 450 is thermally coupled to the TOF mass analyser 400. The telescopic compensation electrode 450 may be suspended in the flight chamber 438 in a similar manner to the other embodiments.

The telescopic compensation electrode 450 comprises a first telescopic portion 452, a second telescopic portion 454 and a spring 456. The spring 456 is arranged between the first and second telescopic portions 452, 454. The spring 456 is configured to cause the relative positions of the first and second telescopic portions 452, 454 to change in response to a change in temperature of the telescopic compensation electrode 450. As such, telescopic expansion of the telescopic compensation electrode 450 causes the length of the high speed regions 470 of the ion flight path to increase relative to the length of the low speed regions 460 of the ion flight path.

For example, the spring 456 may be a bi-metallic spring (bi-metallic strip) which is configured to provide a temperature-dependent force to separate the first telescopic portion 452 from the second telescopic portion 454. As such, the bi-metallic spring is configured to convert a change in temperature into a mechanical displacement of the second telescopic portion 454 from the first telescopic portion 452. As shown in FIG. 5, the spring 456 is configured to telescopically extend the second telescopic portion 454 in the elongate direction of the flight chamber 438 in response to an increase in temperature. Thus, the length of the high speed region 470 of the TOF mass analyser 400 increases with an increase in temperature. It will be appreciated that by using a bi-metallic spring to displace the second telescopic portion 454 may provide for larger changes in the relative length of the high speed regions 470 to the low speed regions than may be achieved by thermal expansion of compensation electrodes alone. For example, a bi-metallic spring may be provided to produce displacements of about 0.1 mm/K. Thus, the telescopic compensation electrode 470 is well suited to compensating for relatively high magnitude mass shifts per Kelvin (e.g. a flight chamber constructed from aluminium).

While the telescopic compensation electrode 450 is shown as part of a TOF mass analyser 400 comprising an ion mirror 402, it will be appreciated that the concept of a telescopic compensation electrode 450 may be applied to any type of mass analyser incorporating a compensation electrode for compensation of mechanical thermal expansion.

The compensation electrodes 250, 350, 450 of this disclosure may be applied to a range of different mass analysers. For example, FIG. 6 shows a schematic diagram of a MRTOF 500 comprising a compensation electrode 550.

The MRTOF 500 comprises a first converging ion mirror 502 and a second converging ion mirror 504. The first and second converging ion mirrors 502, 504 are arranged opposite each other in order to define an ion flight path which involves multiple reflections between the first and second converging ion mirrors 502, 504. As further shown in FIG. 6, ions are input into the MR-ToF 500 from an ion trap source 530. The ions travel from the ion trap source 530 through a first out-of-plane lens 531, a first deflector 532, a second out-of-plane-lens 533, and a second deflector 534, before travelling between the converging ion mirrors 502, 504. Ions leaving the MRTOF 500 are captured by an ion detector 536. The flight path of ions through the MRTOF 500 from the ion trap source 530 to the ion detector 536 is indicated schematically in FIG. 6. THE MRTOF 500 may be provided in a flight chamber 538. In FIG. 6, the first converging ion mirror 502 comprises five mirror electrodes 505, 506, 507, 508, 509. The first and second converging ion mirrors 502, 504 may be connected to a voltage supply (not shown) in order supply appropriate voltages to the mirror electrodes. As shown in FIG. 6, a pair of correction stripe electrodes 540 may also be provided between the ion mirrors 502, 504. Correction stripe electrodes are described in further detail in U.S. Pat. No. 9,136,101. As such, it will be appreciated that the construction of the MRTOF 500 is similar to the MRTOF 100 shown in the embodiment of FIG. 2.

Figure 6:
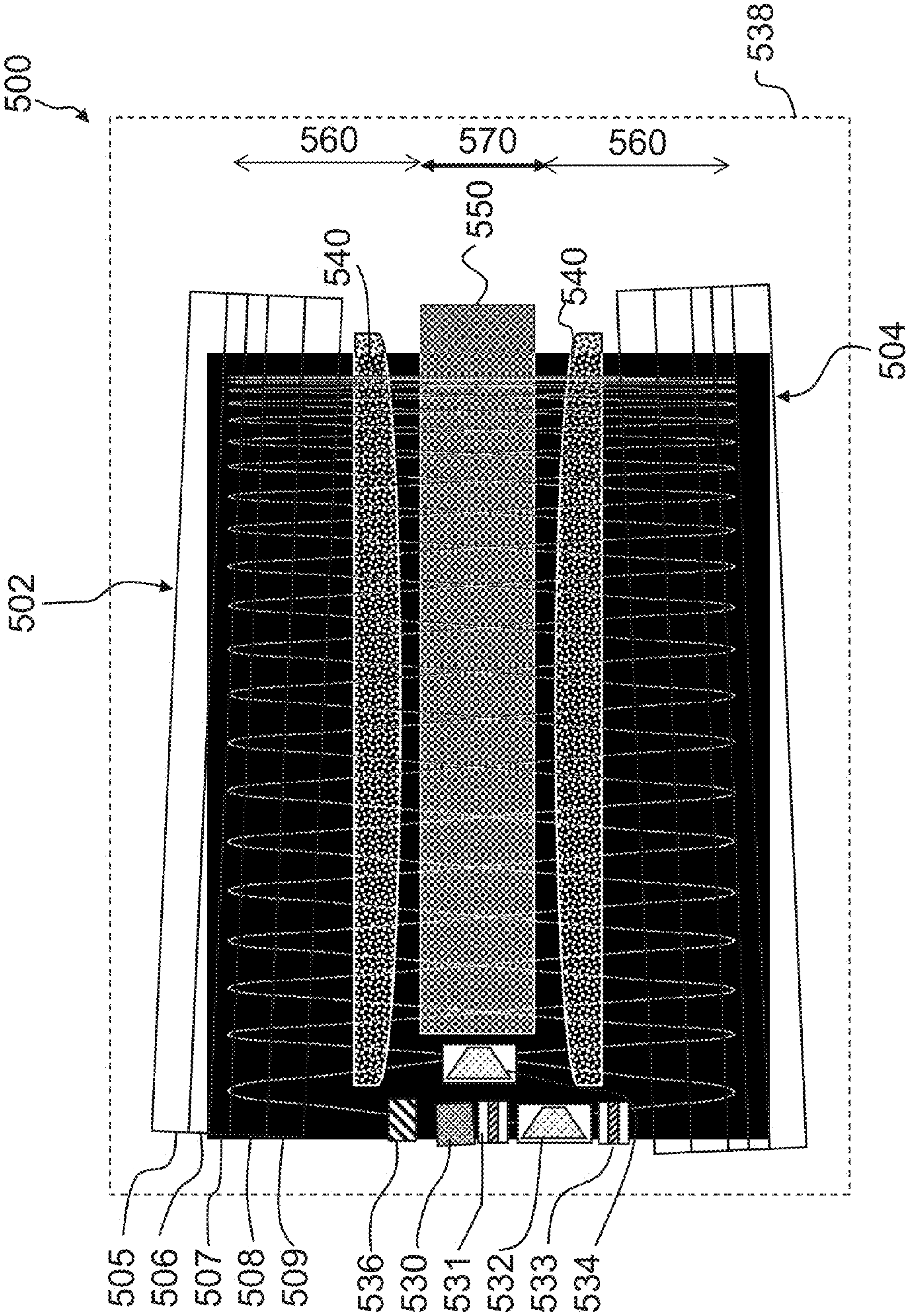
FIG. 6 shows a schematic diagram of another multiple reflection Time of Flight mass analyser including a compensation electrode.

The MRTOF 500 of FIG. 6 also comprises a compensation electrode 550. The compensation electrode is arranged between the first and second ion mirror 502, 504. As shown in FIG. 6, the compensation electrode 550 may be a plate electrode (or a pair of opposing plate electrodes) which is generally aligned with the first and second ion mirrors 502, 504. Accordingly, the ion flight path crosses the compensation electrode 550 a plurality of times as ions are reflected between the first and second ion mirrors 502, 504. Thus, the MRTOF 500 of FIG. 6 includes a plurality of high speed regions 570 of the ion flight path, where the ions flight path overlaps with the compensation electrode 550. The ion flight path also includes a plurality of low speed regions 560 away from the compensation electrode 550. For example, the regions of the ion flight path where ions are reflected by the first and second ion mirrors 502, 504 are low speed regions 560.

It will be appreciated that the compensation electrode 550 compensates for thermal expansion of the MRTOF 500 in a similar manner to the compensation electrodes 250, 350, 450 discussed in relation to the embodiments of FIGS. 3*a*, 4*a* and 5.

Figure 7:
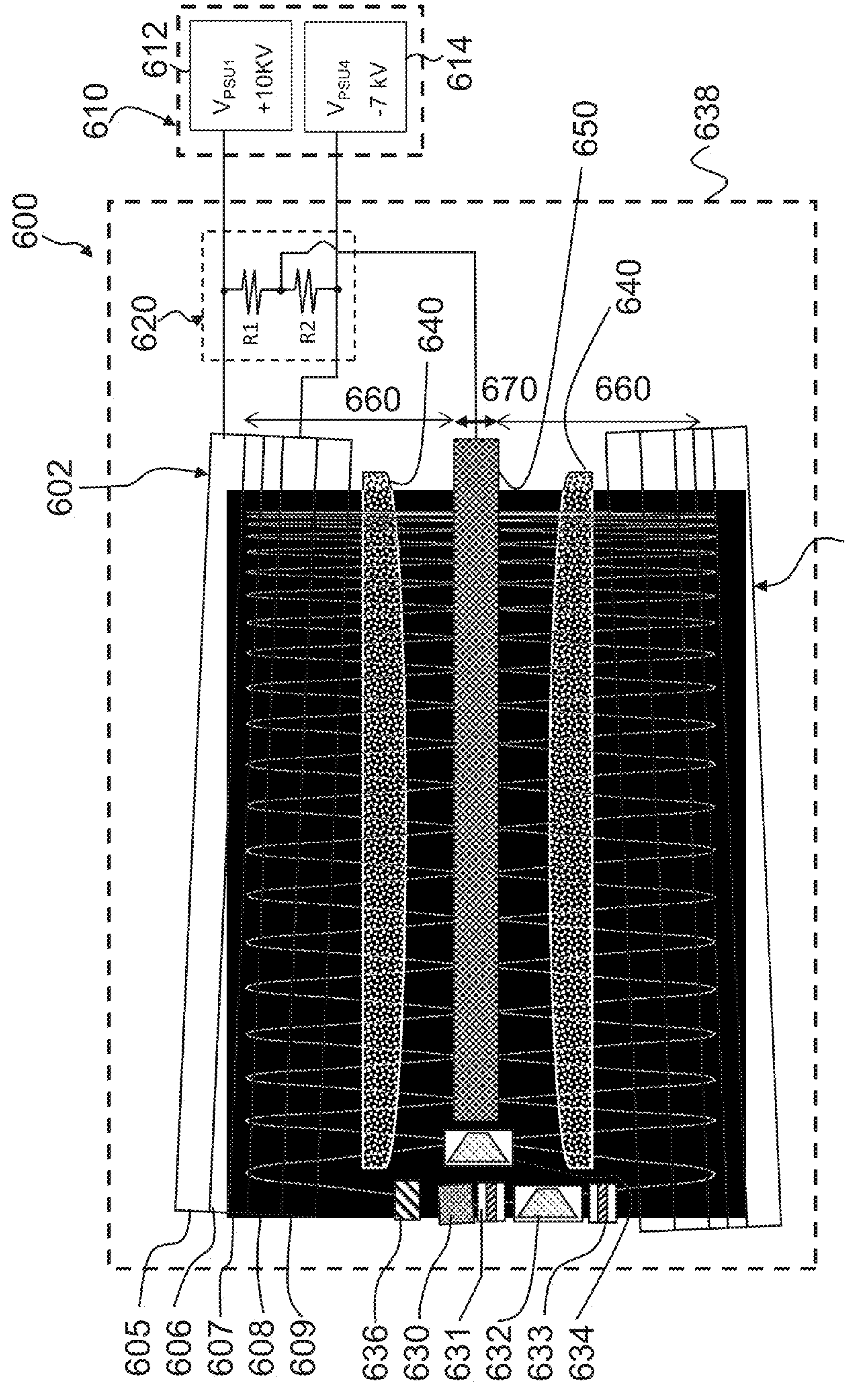
FIG. 7 shows a schematic diagram of another multiple reflection Time of Flight mass analyser including a compensation electrode and a resistive divider.

In some embodiments, a mass analyser may be provided which provides compensation for mechanical thermal expansion by way of a compensation electrode 650 and a resistive divider 620. FIG. 7 shows a schematic diagram of an MFTOF 600 and a voltage supply 610 according to an embodiment of the disclosure wherein the MRTOF 600 includes a compensation electrode 650 and a resistive divider 620.

Similar to the MRTOFs 100, 500 of FIGS. 2 and 6, the MRTOF 600 comprises a first converging ion mirror 602 and a second converging ion mirror 604. The first converging ion mirror 602 comprises five mirror electrodes 605, 606, 607, 608, 609. The first converging ion mirror 602 is connected to a voltage supply 610. As further shown in FIG. 7, ions are input into the MR-ToF 600 from an ion trap source 630. The ions travel from the ion trap source 630 through a first out-of-plane lens 631, a first deflector 632, a second out-of-plane-lens 633, and a second deflector 634, before travelling between the converging ion mirrors 602, 604. Ions leaving the MRTOF 600 are captured by an ion detector 636. The flight path of ions through the MRTOF 600 from the ion trap source 630 to the ion detector 636 is indicated schematically in FIG. 7. The MRTOF 600 is provided in a flight chamber 638. A pair of correction stripe electrodes 640 may also be provided between the ion mirrors 602, 604.

As with the other embodiments of this disclosure, it will be understood that a change in temperature causes the MRTOF 600 to undergo a first mass shift per Kelvin ($\Delta_{T1}$), for example as a result of thermal expansion of the MRTOF 600.

The MRTOF 600 of FIG. 7 also comprises a compensation electrode 650. The compensation electrode 650 is arranged between the first and second ion mirror 602, 604. As shown in FIG. 7, the compensation electrode 650 may be a plate electrode which is generally aligned with the first and second ion mirrors 602, 604. Accordingly, the ion flight path crosses the compensation electrode 650 a plurality of times as ions are reflected between the first and second ion mirrors 602, 604. Thus, the MRTOF 600 of FIG. 7 includes a plurality of high speed regions 670 of the ion flight path, where the ions flight path overlaps with the compensation electrode 650. The ion flight path also includes a plurality of low speed regions 660 away from the compensation electrode 650. For example, the regions of the ion flight path where ions are reflected by the first and second ion mirrors 602, 604 are low speed regions 660.

It will be appreciated that the compensation electrode 650 compensates for thermal expansion of the MRTOF 600 in a similar manner to the compensation electrodes 250, 350, 450 550 discussed in relation to the embodiments of FIGS. 3*a*, 4*a*, 5 and 6. That is to say, thermal expansion of the compensation electrode 650, relative to the thermal expansion of the MRTOF 600 causes a change in the length of the high speed region 670 of the ion flight path. The change in length of the high speed regions of the ion flight path results in a shift in the mass detected by the MRTOF 600. Thus, the compensation electrode 650 has a thermal expansion coefficient ($C_{electrode}$) such that thermal expansion of the compensation electrode 650 causes a second mass shift per Kelvin $\Delta_{T2}$ of ions detected at the detector 636.

The MRTOF 600 also comprises a resistive divider 620. The resistive divider 620 comprises a first and resistor $R_1$ and second resistor $R_2$. Similar to the resistive dividers 20, 120 of the embodiments of FIGS. 1 and 2, the resistive divider 120 is thermally coupled to the MRTOF 600. In the embodiment of FIG. 7, the resistive divider 620 is configured to receive an input voltage $V_{PSU1}$ from the voltage supply 610 and output an output voltage to an electrode of the MRTOF 600. In the embodiment of FIG. 7, the resistive divider 620 outputs the output voltage to the compensation electrode 650.

Similar to the resistive dividers 20, 120 discussed above, the first and second resistors $R_1$, $R_2$ have respective first and second temperature coefficients $C_1$, $C_2$ configured to provide a voltage shift per Kelvin $\Delta_V$ to the output voltage to the compensation electrode 650 which results in a third mass shift per Kelvin $\Delta_{T3}$ of ions detected at the detector 636. It will be appreciated that the resistances and temperature coefficients for the resistors of the resistive divider 620 may be selected in accordance with the principals discussed above.

As such, the embodiment of FIG. 7 provides two temperature compensating mass shifts per Kelvin $\Delta_{T2}$, $\Delta_{T3}$ in order to compensate for the first mass shift per Kelvin $\Delta_{T1}$.

In the embodiment of FIG. 7, the resistive divider 620 provides the output voltage for the compensating electrode 650. Of course, in other embodiments, the resistive divider may be provide an output voltage for different electrode of the MRTOF 600 to the compensation electrode 650.

In the embodiment of FIG. 7, the resistive divider 620 is connected between the second supply voltages $V_{PSU1}$, $V_{PSU4}$ for two of the electrodes of the MRTOF 600. As such, the output voltage for the compensation electrode 650 is derived from voltages provided to MRTOF 600, rather than requiring an additional voltage supply. Of course, in other embodiments, the resistive divider 620 may be connected between a supply voltage and ground, as in the embodiments of FIGS. 1 and 2. The skilled person will appreciate that the resistive divider 620 may be implemented in various different configurations, depending on the availability of voltage supplies for the mass analyser to be thermally compensated. By using voltages already supplied to the electrodes of the ion mirror 602, the resistive divider 620 may be more easily thermally coupled to the ion mirror 602 of the MRTOF 600, thereby providing improved temperature compensation.

Next a method of operating the Time of Flight mass analyser (a method of time of flight mass spectrometry) will be described. It will be appreciated that the skilled person is familiar with methods of Time of Flight mass spectrometry and so details regarding the preparation of samples, operation of a TOF mass analyser and the like will be omitted. The following method will be described with reference to the MRTOF 600 of FIG. 7, but it will be appreciated that the method may be applied to the other mass analysers 1, 100, 200, 300, 400, 500 of this disclosure Thus, according to an embodiment of this disclosure, the method of TOF mass spectrometry comprises using the MRTOF 600 to measure a time of flight for ions to travel along an ion flight path from the ion source 630 to the detector 636. An electrode (compensation electrode 650) is arranged along the ion flight path and receives an output voltage from the resistive divider 620.

As described above, thermal expansion of the MRTOF 600 results in a first mass shift per Kelvin of ions $\Delta_{T1}$ detected at the detector.

The MRTOF 600 is provided with a compensation electrode 650 thermally coupled to the MRTOF 650. The compensation electrode 650 is arranged along the ion flight path to define the high speed regions 670 of the ion flight path. The compensation electrode 650 is configured to cause ions to travel along the ion flight path in the high speed regions 670 at a higher speed than the speed of the ions in the low speed regions 660. The compensation electrode 650 has a thermal expansion coefficient $C_{electrode}$ such that thermal expansion of the compensation electrode 650 causes a second mass shift per Kelvin of ions $\Delta_{T2}$ detected at the detector 636 which compensates for the first mass shift per Kelvin $\Delta_{T1}$.

The MRTOF 600 is also provided with a resistive divider 620 comprising a first resistor $R_1$ and a second resistor $R_2$. The resistive divider 620 is thermally coupled to the MRTOF 600. The resistive divider 620 is configured to receive an input voltage from the voltage supply 610 and output the output voltage to the compensation electrode 650. The first and second resistors $R_1$, $R_2$ have respective first and second temperature coefficients $C_1$, $C_2$ which result in a voltage shift per Kelvin to the output voltage to the compensation electrode 650 which results in a third mass shift per Kelvin $\Delta_{T3}$ of ions detected at the detector which compensates for the first mass shift per Kelvin.

Thus, during the measurement of the time of flight for ions to travel along an ion flight path, the compensation electrode 650 and/or the resistive divider 620 provide passive compensation for any shift in detected mass that may result from a change in temperature of the MRTOF 600.

It will be appreciated that the method of TOF mass spectrometry described above may be applied to any suitable type of analysis. For example, the method may be a method of data dependent analysis (DDA) mass spectrometry, or the method be a method of data independent analysis (DIA) mass spectrometry. In some embodiments, the method may comprises performing a plurality of analyses, over which the compensation electrode 650 and/or the resistive divider 620 provides passive compensation for any changes in temperature.

Thus, according to this disclosure mass analysers and methods of mass spectrometry, in particular TOF mass analysers/mass spectrometry, are provided which incorporate features for passively compensating for shifts in detected mass of ions resulting from mechanical thermal expansion of the mass analyser.

The invention claimed is:

1. A Time of Flight (TOF) mass analyser comprising:

an ion source;

a detector, wherein the ion source and the detector are arranged to define an ion flight path from the ion source to the detector;

an electrode arranged along the ion flight path and configured to receive an output voltage, wherein thermal expansion of the TOF mass analyser results in a first mass shift per Kelvin of ions detected at the detector;

the TOF mass analyser further comprising:

a resistive divider comprising first and second resistors, the resistive divider thermally coupled to the time of flight mass analyser; and configured to receive an input voltage and output the output voltage to the electrode, wherein the first and second resistors have respective first and second temperature coefficients configured to provide a voltage shift per Kelvin to the output voltage to the electrode which results in a second mass shift per Kelvin of ions detected at the detector which compensates for the first mass shift per Kelvin.

2. A TOF mass analyser according to claim 1, further comprising an ion mirror, wherein the ion mirror comprising the electrode is arranged along the ion flight path and configured to receive the output voltage.

3. A TOF mass analyser according to claim 1, further comprising a vacuum chamber, wherein the electrode and the resistive divider are provided within the vacuum chamber.

4. A TOF mass analyser according to claim 1, wherein the first and second temperature coefficients are different.

5. A TOF mass analyser according to claim 1, wherein the first mass shift per Kelvin of the TOF mass analyser is at least +2 ppm/K or at least 5 ppm/K.

6. A TOF mass analyser according to claim 1, wherein a magnitude of the combination of the first and second mass shifts per Kelvin is no greater than 5 ppm/K, 3 ppm/K, or 1 ppm/K.

7. A TOF mass analyser according to claim 1, wherein one or more of the first and second resistors are provided as a plurality of resistive components.

8. A TOF mass analyser according to claim 1, wherein a voltage supply is connected to the TOF mass analyser, the voltage supply configured to provide the input voltage to the resistive divider.

9. A TOF mass analyser according to claim 1, wherein the ion flight path comprises a first region and a second region, wherein the mass analyser further comprises a compensation electrode which is thermally coupled to the TOF mass analyser and arranged along the ion flight path in the second region of the ion flight path, the compensation electrode configured to cause ions to travel along the ion flight path in the second region at a higher speed than a speed of the ions in the first region, wherein the compensation electrode has a thermal expansion coefficient such that thermal expansion of the compensation electrode causes a third mass shift per Kelvin of ions detected at the detector wherein the second and third mass shifts per Kelvin compensate for the first mass shift per Kelvin.

10. A TOF mass analyser according to claim 9, wherein the electrode arranged along the ion flight path and configured to receive the output voltage is the compensation electrode.

11. A Time of Flight (TOF) mass analyser, comprising:

an ion source;

a detector, wherein the ion source and the detector are arranged to define an ion flight path from the ion source to the detector, the ion flight path comprising a first region and a second region, wherein thermal expansion of the TOF mass analyser results in a first mass shift per Kelvin of ions detected at the detector; and a compensation electrode thermally coupled to the TOF mass analyser and arranged along the ion flight path in the second region of the ion flight path, the compensation electrode configured to cause ions to travel along the ion flight path in the second region at a higher speed than a speed of the ions in the first region wherein the compensation electrode has a thermal expansion coefficient such that the thermal expansion of the compensation electrode causes a second mass shift per Kelvin of ions detected at the detector which compensates for the first mass shift per Kelvin.

12. A TOF mass analyser according to claim 11, further comprising an ion mirror, wherein the compensation electrode is arranged along the ion flight path between the ion mirror and the detector.

13. A TOF mass analyser according to claim 12, wherein the compensation electrode is arranged on the ion flight path closer to the detector than the ion mirror.

14. A TOF mass analyser according to claim 11, further comprising:

a pair of ion mirrors arranged opposite each other such that ions on the ion flight path are reflected between the pair of ion mirrors a plurality of times, wherein the compensation electrode is arranged between the pair of ion mirrors.

15. A TOF mass analyser according to claim 11, wherein a length of the ion flight path has a thermal expansion coefficient which is different to the thermal expansion coefficient of the compensation electrode.

16. A TOF mass analyser according to claim 11, wherein the first mass shift per Kelvin of the TOF mass analyser is at least +2 ppm/K or at least 5 ppm/K.

17. A TOF mass analyser according claim 11, wherein a magnitude of the combination of the first and second mass shifts per Kelvin is no greater than 5 ppm/K, 3 ppm/K, or 1 ppm/K.

18. A TOF mass analyser according to claim 11, wherein:

the compensation electrode is a telescopic compensation electrode comprising a first telescopic portion, a second telescopic portion and a spring, the spring being arranged between the first and second telescopic portions, and the spring is configured to cause relative positions of the first and second telescopic portions to change in response to a change in temperature of the telescopic compensation electrode.

19. A TOF mass analyser according to claim 11, further comprising:

a resistive divider comprising a first and second resistor, the resistive divider thermally coupled to the time of flight mass analyser; and configured to receive an input voltage and output an output voltage to the compensation electrode, wherein the first and second resistors have respective first and second temperature coefficients configured to provide a voltage shift per Kelvin to the output voltage to the compensation electrode which results in a third mass shift per Kelvin of ions detected at the detector wherein the second and third mass shifts per Kelvin compensate for the first mass shift per Kelvin.

20. A method of Time of Flight (TOF) mass spectrometry comprising:

measuring a time of flight for ions to travel along an ion flight path from an ion source to a detector using a TOF mass analyser, wherein an electrode is arranged along the ion flight path and receives an output voltage, wherein thermal expansion of the TOF mass analyser results in a first mass shift per Kelvin of ions detected at the detector, wherein the TOF mass analyser is provided with a resistive divider comprising first and second resistors, the resistive divider thermally coupled to the TOF mass analyser, and configured to receive an input voltage and output the output voltage to the electrode, wherein the first and second resistors have respective first and second temperature coefficients which result in a voltage shift per Kelvin to the output voltage to the electrode which results in a second mass shift per Kelvin of ions detected at the detector which compensates for the first mass shift per Kelvin.

21. A method of TOF mass spectrometry comprising:

measuring a time of flight for ions to travel along an ion flight path from an ion source to a detector using a TOF mass analyser, the ion flight path comprising a first region and a second region;

wherein thermal expansion of the TOF mass analyser results in a first mass shift per Kelvin of ions detected at the detector, and the TOF mass analyser is provided with a compensation electrode thermally coupled to the time of flight mass analyser and arranged along the ion flight path in the second region of the ion flight path, wherein the compensation electrode is configured to cause ions to travel along the ion flight path in the second region at a higher speed than a speed of the ions in the first region, wherein the compensation electrode has a thermal expansion coefficient such that thermal expansion of the compensation electrode causes a second mass shift per Kelvin of ions detected at the detector which compensates for the first mass shift per Kelvin.

* * * * *